US010713939B2

(12) United States Patent
Yang

(10) Patent No.: US 10,713,939 B2
(45) Date of Patent: Jul. 14, 2020

(54) ARTIFICIAL INTELLIGENT SYSTEMS AND METHODS FOR PREDICTING TRAFFIC ACCIDENT LOCATIONS

(71) Applicant: BEIJING DIDI INFINITY TECHNOLOGY AND DEVELOPMENT CO., LTD., Beijing (CN)

(72) Inventor: Ruifei Yang, Hangzhou (CN)

(73) Assignee: BEIJING DIDI INFINITY TECHNOLOGY AND DEVELOPMENT CO., LTD., Beijing (CN)

(*) Notice: Subject to any disclaimer, the term of this patent is extended or adjusted under 35 U.S.C. 154(b) by 0 days.

(21) Appl. No.: 16/236,458

(22) Filed: Dec. 29, 2018

(65) Prior Publication Data

US 2020/0090502 A1    Mar. 19, 2020

Related U.S. Application Data

(63) Continuation of application No. PCT/CN2018/106146, filed on Sep. 18, 2018.

(51) Int. Cl.
*G08G 1/00* (2006.01)
*G06N 5/02* (2006.01)
(Continued)

(52) U.S. Cl.
CPC .............. *G08G 1/0129* (2013.01); *G06N 5/02* (2013.01); *G08G 1/09626* (2013.01); *G08G 1/096741* (2013.01); *H04W 4/021* (2013.01)

(58) Field of Classification Search
CPC ................................ G08G 1/0129; G06N 5/02
See application file for complete search history.

(56) References Cited

U.S. PATENT DOCUMENTS

| 6,246,933 B1 | 6/2001 | Bagué |
| 7,716,002 B1 | 5/2010 | Smith et al. |
| 8,289,187 B1 | 10/2012 | Kerr |
| 9,418,554 B2 * | 8/2016 | Velusamy ............... H04W 4/70 |

(Continued)

FOREIGN PATENT DOCUMENTS

| CN | 102629297 A | 8/2012 |
| CN | 102607553 B | 8/2014 |

(Continued)

OTHER PUBLICATIONS

International Search Report in PCT/CN2018/106146 dated Sep. 18, 2018, 4 Pages.

(Continued)

*Primary Examiner* — Kira Nguyen
(74) *Attorney, Agent, or Firm* — Metis IP LLC

(57) ABSTRACT

Systems and methods for predicting traffic accident location. A method includes: obtaining a plurality of accident records, each accident record is associated with a target user terminal and includes a plurality of locations; determining a plurality of refined accident locations by, for each of the plurality of accident records, operating a first clustering procedure with the corresponding plurality of locations of the target user terminal as inputs of the first clustering procedure and assigning a first result of the first clustering procedure as a refined accident location of the plurality of locations of the target user terminal; and determining at least one accident-prone road section by operating a second clustering procedure with the plurality of refined accident locations corresponding to the plurality of accident records as the inputs of the second clustering procedure.

20 Claims, 15 Drawing Sheets

(51) Int. Cl.
    *G08G 1/01*        (2006.01)
    *G08G 1/0967*      (2006.01)
    *H04W 4/021*       (2018.01)
    *G08G 1/0962*      (2006.01)

(56)            References Cited

U.S. PATENT DOCUMENTS

| | | | |
|---|---|---|---|
| 2011/0210867 A1* | 9/2011 | Benedikt | G08G 1/01 340/905 |
| 2013/0069802 A1 | 3/2013 | Foghel et al. | |
| 2016/0061625 A1 | 3/2016 | Wang | |
| 2016/0379485 A1 | 12/2016 | Anastassov et al. | |
| 2018/0061151 A1 | 3/2018 | Chainer et al. | |
| 2018/0113880 A1 | 4/2018 | Metcalf-Putnam et al. | |
| 2018/0299284 A1* | 10/2018 | Wang | G08G 1/0141 |
| 2019/0147737 A1* | 5/2019 | Madduri | G08G 1/0129 |

FOREIGN PATENT DOCUMENTS

| | | | |
|---|---|---|---|
| CN | 105069853 | A | 11/2015 |
| CN | 103903439 | B | 12/2015 |
| CN | 105472730 | A | 4/2016 |
| CN | 106448149 | A | 2/2017 |
| CN | 106528597 | A | 3/2017 |

OTHER PUBLICATIONS

Written Opinion in PCT/CN2018/106146 dated Sep. 18, 2018, 4 Pages.
The Extended European Search Report in European Application No. 18815928.9 dated Nov. 20, 2019, 10 pages.
First Office Action in Australian Application No. 2018286582 dated Nov. 20, 2019, 6 pages.

\* cited by examiner

500

```
510 — Obtaining a plurality of accident records, each of the plurality of accident records being associated with a corresponding target user terminal and including an on-record accident time and a plurality of locations that the target user terminal appeared around the on-record accident time 520 — Determining a plurality of refined accident locations by, for each of the plurality of accident records, operating a first clustering procedure with the corresponding plurality of locations of the target user terminal as inputs of the first clustering procedure and assigning a first result of the first clustering procedure as a refined accident location of the plurality of locations of the target user terminal 530 — Determining at least one accident-prone road section by operating a second clustering procedure with the plurality of refined accident locations corresponding to the plurality of accident records as the inputs of the second clustering procedure
```

FIG. 5A

ARTIFICIAL INTELLIGENT SYSTEMS AND METHODS FOR PREDICTING TRAFFIC ACCIDENT LOCATIONS

CROSS-REFERENCE TO RELATED APPLICATIONS

This application is a continuation of International Application No. PCT/CN2018/106146, filed on Sep. 18, 2018, the content of which is incorporated herein in its entirety by reference.

TECHNICAL FIELD

The present disclosure generally relates to systems and methods for using artificial intelligence to determine traffic accident locations and accident-prone road sections, and display accident-prone road sections to a user mobile device.

BACKGROUND

Vehicles are widely used in public transportation and have been increasingly popular in people's daily commuting. When an accident happens, a driver of a vehicle, a passenger of the vehicle, a witness of the accident, or a police officer needs to report an accident time and an accident location (e.g., when and where does the accident happens) to seek roadside assistant, ambulant service, firetruck assistant, or insurance services. However, the reported accident time and accident location are often inaccurate, thus causing difficulties to locate the actual accident and delays to provide the necessary services. Accordingly, it is desirable to provide systems and methods for remotely determining an accurate accident time and an accurate accident location such that an efficient locating of an accident can be achieved. Furthermore, it is desirable to provide systems and methods for predicting a plurality of accident-prone areas to provide safety-driving assistant to the driver.

SUMMARY

An aspect of the present disclosure introduces a system of one or more electronic devices for predicting traffic accident locations, the system may include at least one storage medium including a first operation system and a set of instructions compatible with the first operation system for providing an accident-prone road section to at least one information receiving terminal; and at least one processor in communication with the storage medium, wherein when executing the first operation system and the set of instructions, the at least one processor is directed to: obtain a plurality of accident records of a plurality of traffic accidents, each of the plurality of accident records being associated with a corresponding target user terminal and including an on-record accident time of a traffic accident and a plurality of locations that the target user terminal appeared around the on-record accident time; determine a plurality of refined accident locations by, for each of the plurality of accident records, operating a first clustering procedure with the corresponding plurality of locations of the target user terminal as inputs of the first clustering procedure and assigning a first result of the first clustering procedure as a refined accident location of the plurality of locations of the target user terminal; in response to the determination of the plurality of refined accident locations, determine at least one accident-prone road section by operating a second clustering procedure with the plurality of refined accident locations corresponding to the plurality of accident records as the inputs of the second clustering procedure; in response to the determination of the at least one accident-prone road section, generate electronic signals including information of one of the at least one accident-prone road section; and direct the information receiving terminal to display an interface to present the at least one accident-prone road section by sending the electronic signals to the information receiving terminal.

In some embodiments, to operate the first clustering procedure, the at least one processor is directed to: identify a plurality of points corresponding to the inputs; determine a result cluster and a result point associated with the result cluster by a point-identification operation, including: selecting a candidate cluster of points from the plurality of points; selecting a candidate point from the candidate cluster of points; operating a first iterative operation until a first stop criteria is met, wherein the first iterative operation includes a plurality of first iterations, and each of the first iteration includes: using the candidate point as a center point and using the candidate cluster of points as a target cluster of points; identifying, from the target cluster of points, a cluster of points that is within a predetermined distance from the center point as the candidate cluster of points; and identifying a point from the candidate cluster of points as the candidate point.

In some embodiments, in each of the first iteration, the candidate point in the first iteration is associated with average coordinates of the corresponding candidate cluster of points in the first iteration.

In some embodiments, the at least one processor is further directed to: upon that the candidate cluster of points identified in a final first iteration of the first iterative operation meets the first stop criteria, obtain the candidate cluster of points corresponding to the final first iteration as a result cluster of the first iterative operation; and obtain the candidate point corresponding to the final first iteration as a result point of the first iterative operation.

In some embodiments, the at least one processor is further directed to output the result point of the first iterative operation as the first result of the first clustering procedure.

In some embodiments, the result point is one of a plurality of result points and the result cluster is one of a plurality of result clusters; and the at least one processor is further directed to obtain a plurality of subsequent result points and a plurality of subsequent result clusters based on the output of the first iterative operation by operating a second iterative operation until a second stop criteria is met, wherein the second iterative operation includes a plurality of second iterations, and each of the second iteration includes: updating the plurality of points by removing the result cluster of locations identified in the last iteration of the second iterative operation from the plurality of points; and determining a subsequent result cluster of points and a subsequent result point based on the updated plurality of points by performing the point-identification operation.

In some embodiments, the at least one processor is further directed to: for each of the plurality of result clusters, determine a stop time based on an amount of points in the result cluster; determine whether the stop time associated with the result cluster is greater than a time threshold; and in response to that the stop time is greater than the time threshold, assign the result point corresponding to the result cluster as the refined accident location.

In some embodiments, the second clustering procedure includes the first clustering procedure; and to determine the at least one accident-prone road section, the processor is further directed to: obtain the plurality of refined accident locations; determine a plurality of result clusters by operating the second clustering procedure with the plurality of refined accident locations as inputs of the second clustering procedure; and for each of the plurality of result clusters, assign a road section associated with the result cluster as an accident-prone road section.

In some embodiments, the at least one processor is further directed to: for each of the plurality of result clusters, determine an amount of points in the result cluster; determine whether the amount is greater than a density threshold; and in response that the amount is greater than the density threshold, determine a road section associated with the result cluster based on the points in the result cluster.

In some embodiments, to obtain the plurality of accident records, the at least one processor is further directed to: receive a plurality of accident reports, each of the plurality of accident reports being associated with a corresponding target user terminal and including an on-record accident time and an an-record accident location; obtain a plurality of historical locations of the target user terminals; for each of the plurality of accident reports, merge the corresponding on-record accident time and the an-record accident location with the historical locations of the corresponding target user terminal to obtain an accident record associated with the corresponding target user terminal.

In some embodiments, each of the plurality of accident reports includes at least one of: an accident report reported by a user of a target user terminal; an accident report reported by an insurance company; or an accident report reported by a traffic police.

According to another aspect of the present disclosure, a method for predicting traffic accident locations, implemented on one or more electronic devices having at least one storage medium, and at least one processor in communication with the at least one storage medium, may include: obtaining a plurality of accident records of a plurality of traffic accidents, each of the plurality of accident records being associated with a corresponding target user terminal and including an on-record accident time of a traffic accident and a plurality of locations that the target user terminal appeared around the on-record accident time; determining a plurality of refined accident locations by, for each of the plurality of accident records, operating a first clustering procedure with the corresponding plurality of locations of the target user terminal as inputs of the first clustering procedure and assigning a first result of the first clustering procedure as a refined accident location of the plurality of locations of the target user terminal; in response to the determination of the plurality of refined accident locations, determining at least one accident-prone road section by operating a second clustering procedure with the plurality of refined accident locations corresponding to the plurality of accident records as the inputs of the second clustering procedure; in response to the determination of the at least one accident-prone road section, generating electronic signals including information of one of the at least one accident-prone road section; and directing an information receiving terminal to display an interface to present the at least one accident-prone road section by sending the electronic signals to the information receiving terminal.

According to still another aspect of the present disclosure, a non-transitory computer readable medium, comprising an operation system and at least one set of instructions compatible with the operation system for predicting traffic accident locations, wherein when executed by at least one processor of one or more electronic device, the at least one set of instructions directs the at least one processor to: obtain a plurality of accident records of a plurality of traffic accidents, each of the plurality of accident records being associated with a corresponding target user terminal and including an on-record accident time of a traffic accident and a plurality of locations that the target user terminal appeared around the on-record accident time; determine a plurality of refined accident locations by, for each of the plurality of accident records, operating a first clustering procedure with the corresponding plurality of locations of the target user terminal as inputs of the first clustering procedure and assigning a first result of the first clustering procedure as a refined accident location of the plurality of locations of the target user terminal; in response to the determination of the plurality of refined accident locations, determine at least one accident-prone road section by operating a second clustering procedure with the plurality of refined accident locations corresponding to the plurality of accident records as the inputs of the second clustering procedure; in response to the determination of the at least one accident-prone road section, generate electronic signals including information of one of the at least one accident-prone road section; and direct the information receiving terminal to display an interface to present the at least one accident-prone road section by sending the electronic signals to the information receiving terminal.

According to still another aspect of the present disclosure, a system for predicting traffic accident locations may include: a record obtaining module configured to obtain a plurality of accident records of a plurality of traffic accidents, each of the plurality of accident records being associated with a corresponding target user terminal and including an on-record accident time of a traffic accident and a plurality of locations that the target user terminal appeared around the on-record accident time; an accident location determination module configured to determine a plurality of refined accident locations by, for each of the plurality of accident records, operating a first clustering procedure with the corresponding plurality of locations of the target user terminal as inputs of the first clustering procedure and assigning a first result of the first clustering procedure as a refined accident location of the plurality of locations of the target user terminal; a road section determination module configured to, in response to the determination of the plurality of refined accident locations, determine at least one accident-prone road section by operating a second clustering procedure with the plurality of refined accident locations corresponding to the plurality of accident records as the inputs of the second clustering procedure; and an information sending module configured to send information of the at least one accident-prone road section to an information receiving terminal.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

FIG. 5A is a flowchart illustrating an exemplary process for determining at least one accident-prone road section according to some embodiments of the present disclosure;

DETAILED DESCRIPTION

Figure 1:
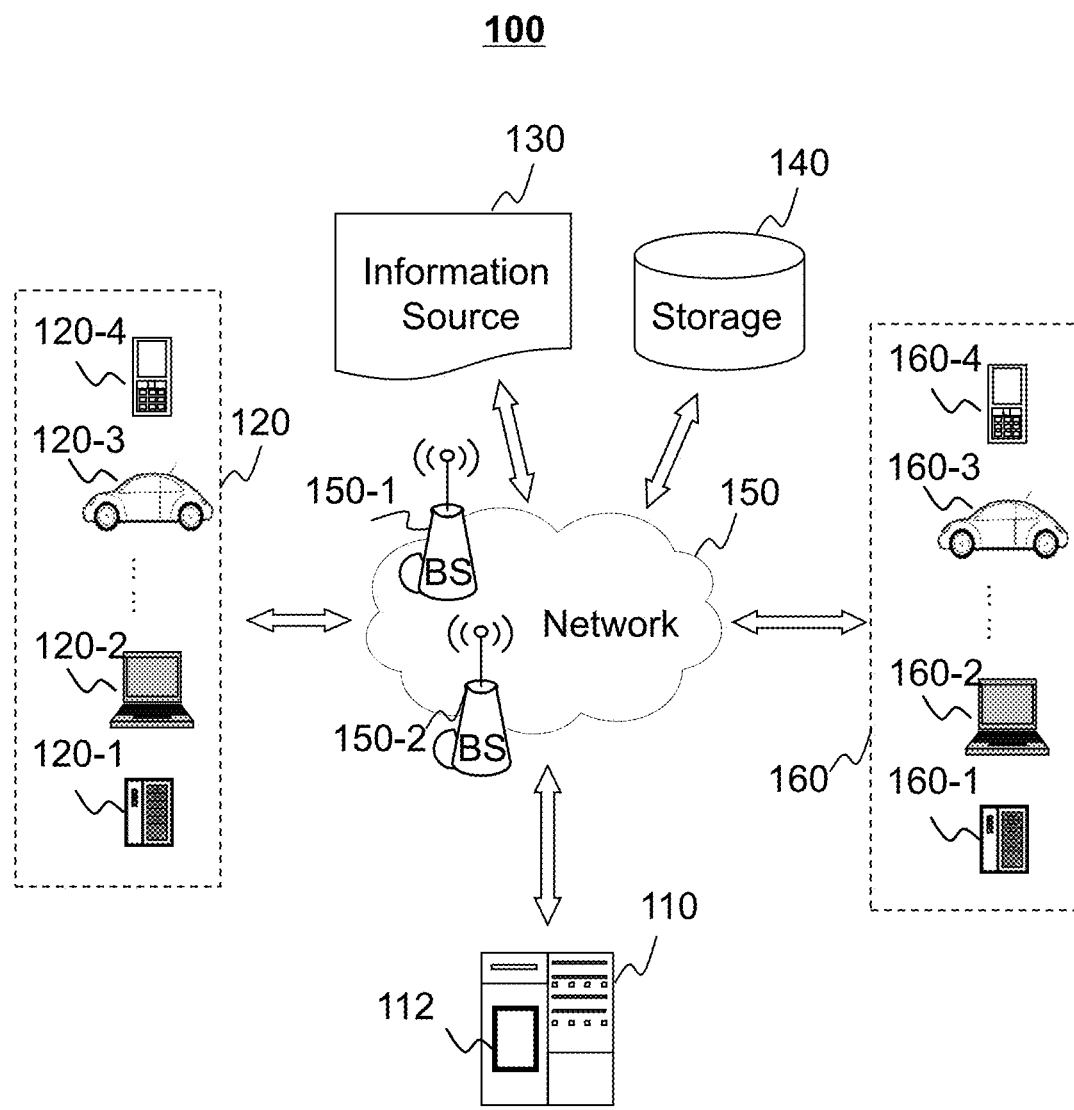
FIG. 1 is a schematic diagram illustrating an exemplary artificial intelligent (AI) system according to some embodiments of the present disclosure.

The following description is presented to enable any person skilled in the art to make and use the present disclosure, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown but is to be accorded the widest scope consistent with the claims.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprises," "comprising," "includes," and/or "including" when used in this disclosure, specify the presence of stated features, integers, steps, operations, elements, and/or components, but do not preclude the presence or addition of one or more other features, integers, steps, operations, elements, components, and/or groups thereof.

These and other features, and characteristics of the present disclosure, as well as the methods of operations and functions of the related elements of structure and the combination of parts and economies of manufacture, may become more apparent upon consideration of the following description with reference to the accompanying drawing(s), all of which form part of this specification. It is to be expressly understood, however, that the drawing(s) are for the purpose of illustration and description only and are not intended to limit the scope of the present disclosure. It is understood that the drawings are not to scale.

The flowcharts used in the present disclosure illustrate operations that systems implement according to some embodiments of the present disclosure. It is to be expressly understood, the operations of the flowcharts may be implemented not in order. Conversely, the operations may be implemented in inverted order, or simultaneously. Moreover, one or more other operations may be added to the flowcharts. One or more operations may be removed from the flowcharts.

The positioning technology used in the present disclosure may include a global positioning system (GPS), a global navigation satellite system (GLONASS), a compass navigation system (COMPASS), a Galileo positioning system, a quasi-zenith satellite system (QZSS), a wireless fidelity (WiFi) positioning technology, or the like, or any combination thereof. One or more of the above positioning technologies may be used interchangeably in the present disclosure.

An aspect of the present disclosure relates to systems and methods for predicting accurate traffic accident locations and accident-prone road sections, and presenting the accident-prone road sections to a user of a user mobile device. To this end, the systems and methods may analyze the driving trajectories of an accident vehicle, and match an accident time and an accident location that are reported by an accident information provider (e.g., a driver of the accident vehicle, an insurance company of the accident vehicle, etc.) with the data of the driving trajectories. The systems may further obtain location data of the accident vehicle to determine an accurate traffic accident location. The systems may further cluster the location data according to durations of stop of the vehicle in an area to obtain the accurate traffic accident location of the accident vehicle. Furthermore, the systems may obtain a plurality of accurate traffic accident locations of a plurality of accident to determine accident-prone road sections. The systems may cluster the plurality of accurate traffic accident locations according to the frequencies of traffic accidents to obtain the accident-prone road sections, and present the accident-prone road sections to alert an information receiver (e.g., a driver, a passenger, etc.) to be cautious when passing by the accident-prone road sections.

FIG. 1 is a schematic diagram of an exemplary AI system 100 according to some embodiments of the present disclosure. In some embodiments, the AI system 100 may be an online to offline service AI system. For example, the AI system 100 may be an online to offline service platform for transportation services such as taxi hailing, chauffeur services, delivery vehicles, carpool, bus service, driver hiring, shuttle services, and online navigation services. The AI system 100 may be an online platform including a server 110, a user terminal 120, an information source 130, a storage 140, a network 150, and an information receiving terminal 160. The server 110 may include a processing engine 112.

The server 110 may be configured to process information and/or data relating to an accident record. For example, the server 110 may determine a refined accident location for each accident record. As another example, the server 110 may determine a plurality of accident-prone road section based on a plurality of refined accident locations associated with a plurality of accident record. The refined accident location may be an accurate location where an actual traffic accident included in the accident record happens. The accident-prone road section may be a place or an area where traffic accidents are more likely to happen than other places or areas.

In some embodiments, the server 110 may be a single server, or a server group. The server group may be centralized, or distributed (e.g., server 110 may be a distributed system). In some embodiments, the server 110 may be local or remote. For example, the server 110 may access information and/or data stored in the information proving system 130, and/or the storage 130 via the network 150. As another example, the server 110 may connect to the storage 130 to access stored information and/or data. In some embodiments, the server 110 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof. In some embodiments, the server 110 may be implemented on a computing device 200 having one or more components illustrated in FIG. 2 in the present disclosure.

In some embodiments, the server 110 may include a processing engine 112. The processing engine 112 may process information and/or data relating to the accident record to perform one or more functions described in the present disclosure. For example, the processing engine 112 may determine a refined accident location for each accident record. As another example, the processing engine 112 may determine a plurality of accident-prone road section based on a plurality of refined accident locations associated with a plurality of accident record. In some embodiments, the processing engine 112 may include one or more processing engines (e.g., single-core processing engine(s) or multi-core processor(s)). Merely by way of example, the processing engine 112 may include one or more hardware processors, such as a central processing unit (CPU), an application-specific integrated circuit (ASIC), an application-specific instruction-set processor (ASIP), a graphics processing unit (GPU), a physics processing unit (PPU), a digital signal processor (DSP), a field programmable gate array (FPGA), a programmable logic device (PLD), a controller, a microcontroller unit, a reduced instruction-set computer (RISC), a microprocessor, or the like, or any combination thereof.

The user terminal 120 may be any type of devices that used by a user to report a traffic accident. For example, the user terminal 120 may send an accident report including a record accident time and a record accident location for reporting a traffic accident to the server 110. The user of the user terminal 120 may be any organization or individual that reports the traffic accident, for example, a driver (or a passenger) of the traffic accident, a traffic police who handles the traffic accident, a staff of an insurance company of the traffic accident, a witness of the traffic accident, or the like, or any combination thereof. The record accident time and the record accident location may be different from the corresponding actual accident time and actual accident location.

In some embodiments, the user terminal 120 may include any type of devices, for example, a mobile device, an electronic device, an automobile, or the like, or any combination thereof. For example, the user terminal 120 may include a desktop computer 120-1, a laptop computer 120-2, a built-in device in a motor vehicle 120-3, a mobile device 120-4, or the like, or any combination thereof. The built-in device 120-3 may include an onboard computer, an onboard television, an onboard positioning system, etc. The mobile device 120-4 may include a wearable device, a smart mobile device, a virtual reality device, an augmented reality device, or the like, or any combination thereof. In some embodiments, the wearable device may include a smart bracelet, a smart footgear, a smart glass, a smart helmet, a smart watch, a smart clothing, a smart backpack, a smart accessory, or the like, or any combination thereof. In some embodiments, the smart mobile device may include a smartphone, a personal digital assistance (PDA), a gaming device, a navigation device, a point of sale (POS) device, or the like, or any combination thereof. In some embodiments, the virtual reality device and/or the augmented reality device may include a virtual reality helmet, a virtual reality glass, a virtual reality patch, an augmented reality helmet, an augmented reality glass, an augmented reality patch, or the like, or any combination thereof. For example, the virtual reality device and/or the augmented reality device may include a Google Glass™, a RiftCon™, a Fragments™, a Gear VR™, etc. In some embodiments, the user terminal 120 may be a device with positioning technology for locating the position of the user terminal 120 and/or the user thereof. In some embodiments, the user terminal 120 may be implemented on a computing device 200 having one or more components illustrated in FIG. 2, or a mobile device 300 having one or more components illustrated in FIG. 3 in the present disclosure.

The information source 130 may be a source configured to provide information for the system 100. For example, the information source 130 may provide the system 100 with traffic accident reports. The information source 130 may be a traffic system of traffic police or an insurance system of an insurance company. As another example, the information source 130 may provide the system 100 with information and/or data relating to traffic accidents, such as news, real-time traffic conditions, road monitoring image or video, etc. The information source 130 may be a TV station, a radio station, a real-time media, a road network, a road monitoring device, or the like, or any combination thereof. In some embodiments, the information source 130 may include a network port to send and/or receive information to one or more components in the AI system 100 (e.g., the server 110, the storage 140, etc.). For example, the information 130 may send a plurality of accident reports to the server 110 via the network port.

The storage 140 may store data and/or instructions. For example, the storage 140 may store data obtained from the user terminal 120 (e.g., locating data). As another example, the storage 140 may store data and/or instructions that the server 110 may execute or use to perform exemplary methods described in the present disclosure. In some embodiments, the storage 140 may include a mass storage, a removable storage, a volatile read-and-write memory, a read-only memory (ROM), or the like, or any combination thereof. Exemplary mass storage may include a magnetic disk, an optical disk, a solid-state drive, etc. Exemplary removable storage may include a flash drive, a floppy disk, an optical disk, a memory card, a zip disk, a magnetic tape, etc. Exemplary volatile read-and-write memory may include a random-access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (EPROM), an electrically erasable programmable ROM (EEPROM), a compact disk ROM (CD-ROM), and a digital versatile disk ROM, etc. In some embodiments, the storage 140 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

In some embodiments, the storage 140 may include at least one network port to communicate with other devices in the AI system 100. For example, the storage 140 may be connected to the network 150 to communicate with one or more components of the AI system 100 (e.g., the server 110, the user terminal 120) via the at least one network port. One or more components in the AI system 100 may access the data or instructions stored in the storage 140 via the network 150. In some embodiments, the storage 140 may be directly connected to or communicate with one or more components in the AI system 100 (e.g., the server 110, the user terminal 120). In some embodiments, the storage 140 may be part of the server 110.

The network 150 may facilitate exchange of information and/or data. In some embodiments, one or more components of the online to offline service AI system 100 (e.g., the server 110, the user terminal 120, and the storage 140) may transmit information and/or data to other component(s) in the online to offline service AI system 100 via the network 150. For example, the server 110 may obtain a plurality of accident records from an information receiving port of the information source 130 via the network 150. In some embodiments, the network 150 may be any type of wired or wireless network, or combination thereof. Merely by way of example, the network 150 may include a cable network, a wireline network, an optical fiber network, a tele communications network, an intranet, an Internet, a local area network (LAN), a wide area network (WAN), a wireless local area network (WLAN), a metropolitan area network (MAN), a wide area network (WAN), a public telephone switched network (PSTN), a Bluetooth network, a ZigBee network, a near field communication (NFC) network, or the like, or any combination thereof. In some embodiments, the network 150 may include one or more network access points. For example, the network 150 may include wired or wireless network access points such as base stations and/or internet exchange points 150-1, 150-2, . . . , through which one or more components of the online to offline service AI system 100 may be connected to the network 150 to exchange data and/or information between them.

The information receiving terminal 160 may be any type of devices that used by a user to receive information relating to accident-prone road sections. For example, when the information receiving terminal 160 appears around an accident-prone road section, the information receiving terminal 160 may be a mobile device that receive an alert voice or an alert display of the accident-prone road section from the server 110. The user of the information receiving terminal 160 may be a driver, a passenger, a pedestrian, or the like, or any combination thereof. In some embodiments, the information receiving terminal 160 may be a device similar to, or same as the user terminal 120. In some embodiments, the information receiving terminal 160 may be a device with positioning technology for locating the position of the information receiving terminal 160 and/or the user thereof. In some embodiments, the information receiving terminal 160 may be implemented on a computing device 200 having one or more components illustrated in FIG. 2, or a mobile device 300 having one or more components illustrated in FIG. 3 in the present disclosure.

Figure 2:
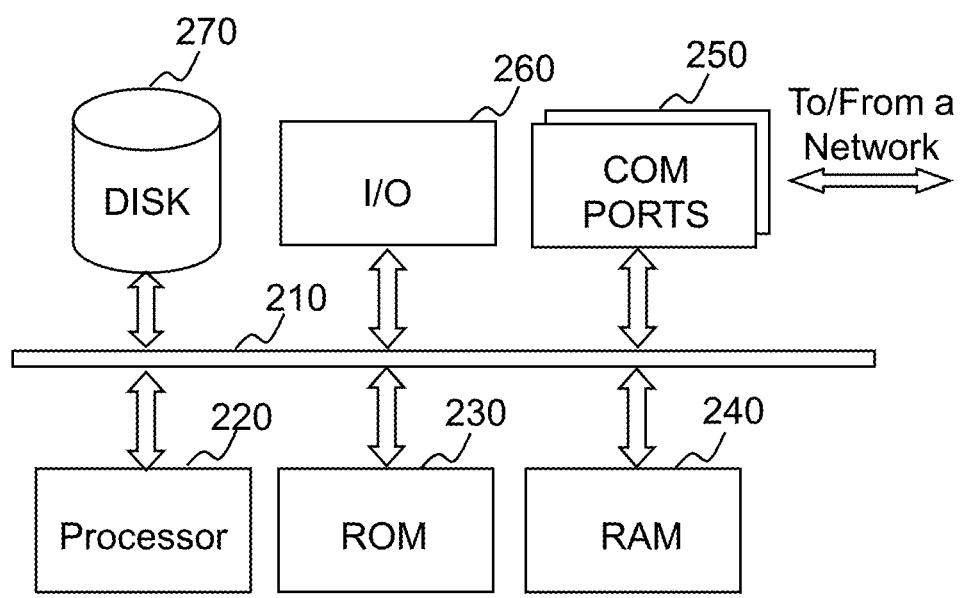
FIG. 2 is a schematic diagram illustrating exemplary hardware and/or software components of a computing device according to some embodiments of the present disclosure.

FIG. 2 is a schematic diagram illustrating exemplary hardware and software components of a computing device 200 on which the server 110, and/or the user terminal 130 may be implemented according to some embodiments of the present disclosure. For example, the processing engine 112 may be implemented on the computing device 200 and configured to perform functions of the processing engine 112 disclosed in this disclosure.

The computing device 200 may be used to implement any component of AI system 100 that perform one or more functions disclosed in the present disclosure. For example, the processing engine 112 may be implemented on the computing device 200, via its hardware, software program, firmware, or a combination thereof. Although only one such computer is shown, for convenience, the computer functions relating to the online to offline service as described herein may be implemented in a distributed fashion on a number of similar platforms, to distribute the processing load.

The computing device 200, for example, may include COM ports 250 connected to and from a network connected thereto to facilitate data communications. The COM port 250 may refer to any network port, information exchange port, or any information transmitting port to facilitate data communications. The computing device 200 may also include a processor (e.g., the processor 220), in the form of one or more processors (e.g., logic circuits), for executing program instructions. For example, the processor may include interface circuits and processing circuits therein. The interface circuits may be configured to receive electronic signals from a bus 210, wherein the electronic signals encode structured data and/or instructions for the processing circuits to process. The processing circuits may conduct logic calculations, and then determine a conclusion, a result, and/or an instruction encoded as electronic signals. The processing circuits may also generate electronic signals including the conclusion or the result (e.g., the accident-prone road section) and a triggering code. In some embodiments, the trigger code may be in a format recognizable by an operation system (or an application installed therein) of an electronic device (e.g., the user terminal 120) in the AI system 100. For example, the trigger code may include an instruction, a code, a mark, a symbol, or the like, or any combination thereof, that can activate certain functions and/or operations of a mobile phone or let the mobile phone execute a predetermined program(s). In some embodiments, the trigger code may be configured to rend the operation system (or the application) of the electronic device to generate a presentation of the conclusion or the result (e.g., accident-prone road section) on an interface of the electronic device. Then the interface circuits may send out the electronic signals from the processing circuits via the bus 210.

The exemplary computing device may include the internal communication bus 210, program storage and data storage of different forms including, for example, a disk 270, and a read only memory (ROM) 230, or a random access memory (RAM) 240, for various data files to be processed and/or transmitted by the computing device. The exemplary computing device may also include program instructions stored in the ROM 230, RAM 240, and/or other type of non-transitory storage medium to be executed by the processor 220. The methods and/or processes of the present disclosure may be implemented as the program instructions. The exemplary computing device may also include operation systems stored in the ROM 230, RAM 240, and/or other type of non-transitory storage medium to be executed by the processor 220. The program instructions may be compatible with the operation systems for providing the online to offline service. The computing device 200 also includes an I/O component 260, supporting input/output between the computer and other components. The computing device 200 may also receive programming and data via network communications.

Merely for illustration, only one processor is illustrated in FIG. 2. Multiple processors are also contemplated; thus, operations and/or method steps performed by one processor as described in the present disclosure may also be jointly or separately performed by the multiple processors. For example, if in the present disclosure the processor of the computing device 200 executes both step A and step B, it should be understood that step A and step B may also be performed by two different processors jointly or separately in the computing device 200 (e.g., the first processor executes step A and the second processor executes step B, or the first and second processors jointly execute steps A and B).

Figure 3:
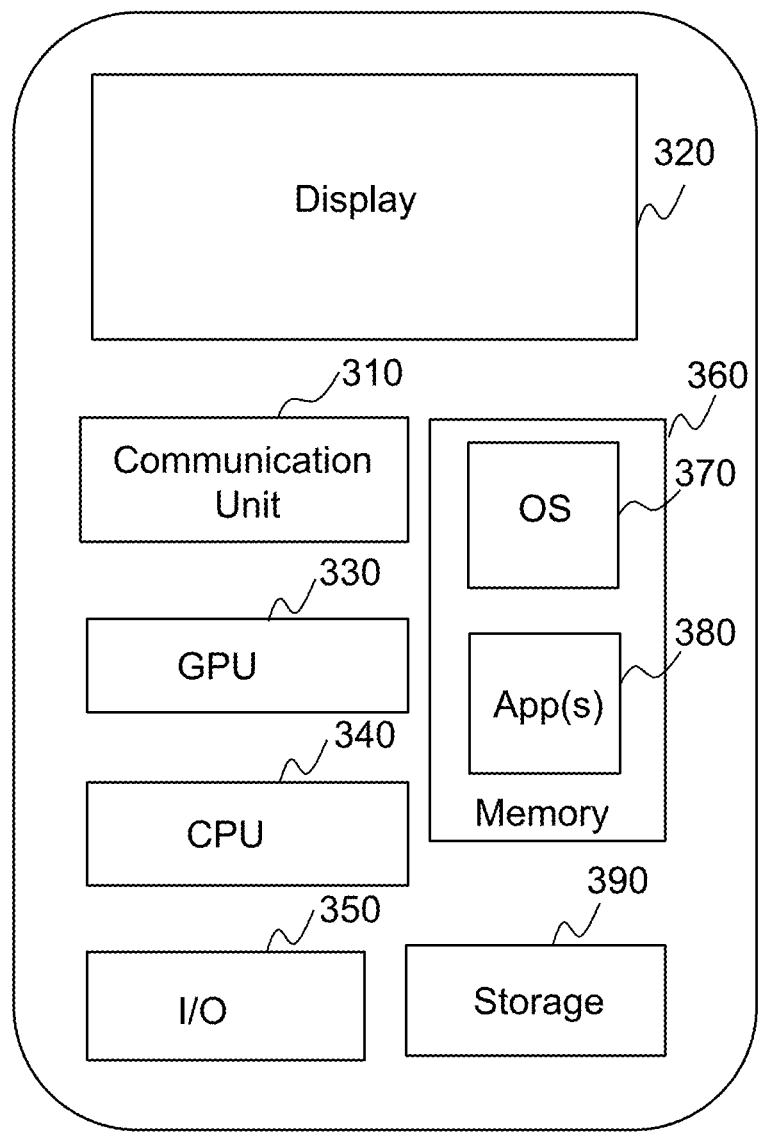
FIG. 3 is a schematic diagram illustrating exemplary hardware and/or software components of a mobile device according to some embodiments of the present disclosure.

FIG. 3 is a schematic diagram illustrating exemplary hardware and/or software components of an exemplary mobile device 300 on which the user terminal 130 may be implemented according to some embodiments of the present disclosure.

As illustrated in FIG. 3, the mobile device 300 may include a communication unit 310, a display 320, a graphic processing unit (GPU) 330, a central processing unit (CPU) 340, an I/O 350, a memory 360, and a storage 390. The CPU may include interface circuits and processing circuits similar to the processor 220. In some embodiments, any other suitable component, including but not limited to a system bus or a controller (not shown), may also be included in the mobile device 300. In some embodiments, a mobile operating system 370 (e.g., iOS™, Android™, Windows Phone™, etc.) and one or more applications 380 may be loaded into the memory 360 from the storage 390 in order to be executed by the CPU 340. The applications 380 may include a browser or any other suitable mobile apps for receiving and rendering information relating to a voice request for a service. User interactions with the information stream may be achieved via the I/O 350 and provided to the processing engine 112 and/or other components of the AI system 100 via the network 120. The communication unit 310 may be any information exchange port, information transmitting port, or network port to facilitate data communications.

To implement various modules, units, and their functionalities described in the present disclosure, computer hardware platforms may be used as the hardware platform(s) for one or more of the elements described herein (e.g., the AI system 100, and/or other components of the AI system 100 described with respect to FIGS. 1-14). The hardware elements, operating systems and programming languages of such computers are conventional in nature, and it is presumed that those skilled in the art are adequately familiar therewith to adapt those technologies to provide a service in response to a voice request as described herein. A computer with user interface elements may be used to implement a personal computer (PC) or other type of work station or terminal device, although a computer may also act as a server if appropriately programmed. It is believed that those skilled in the art are familiar with the structure, programming and general operation of such computer equipment and as a result the drawings should be self-explanatory.

One of ordinary skill in the art would understand that when an element of the AI system 100 performs, the element may perform through electrical signals and/or electromagnetic signals. For example, when a user terminal 120 processes a task, such as report a traffic accident, the user terminal 120 may operate logic circuits in its processor to process such task. When the user terminal 120 sends out the accident report, a processor of the user terminal 120 may generate electrical signals encoding the accident report. The processor of the user terminal 120 may then send the electrical signals to at least one information receiving port of an information providing system associated with the user terminal 120. The information providing system may include the user terminal 120, the network 150, and the information receiving port between the network 150 and the server 110. The user terminal 120 communicates with the information providing system via a wired network, the at least one information exchange port may be physically connected to a cable, which may further transmit the electrical signals to an input port (e.g., an information exchange port) of the server 110. If the user terminal 120 communicates with the information providing system via a wireless network, the at least one information receiving port of the information providing system may be one or more antennas, which may convert the electrical signals to electromagnetic signals. Within an electronic device, such as the user terminal 120, and/or the server 110, when a processor thereof processes an instruction, sends out an instruction, and/or performs an action, the instruction and/or action is conducted via electrical signals. For example, when the processor retrieves or saves data from a storage medium (e.g., the storage 140), it may send out electrical signals to a read/write device of the storage medium, which may read or write structured data in the storage medium. The structured data may be transmitted to the processor in the form of electrical signals via a bus of the electronic device. Here, an electrical signal may refer to one electrical signal, a series of electrical signals, and/or a plurality of discrete electrical signals. After the processor of the server 110 determining a result, the processor may generate electric signals encoding the result, and send the electric signals to at least one information transmitting port of an information receiving system. The information receiving system may include the information receiving terminal 160, the network 150, and the information transmitting port between the network 150 and the server 110. The information receiving terminal 160 communicates with the information receiving system via a wired network, the at least one information transmitting port may be physically connected to a cable, which may further transmit the electrical signals to an input port (e.g., an information exchange port) of the server 110. If the information receiving terminal 160 communicates with the information receiving system via a wireless network, the at least one information transmitting port of the information receiving system may be one or more antennas, which may convert the electrical signals to electromagnetic signals.

Figure 4:
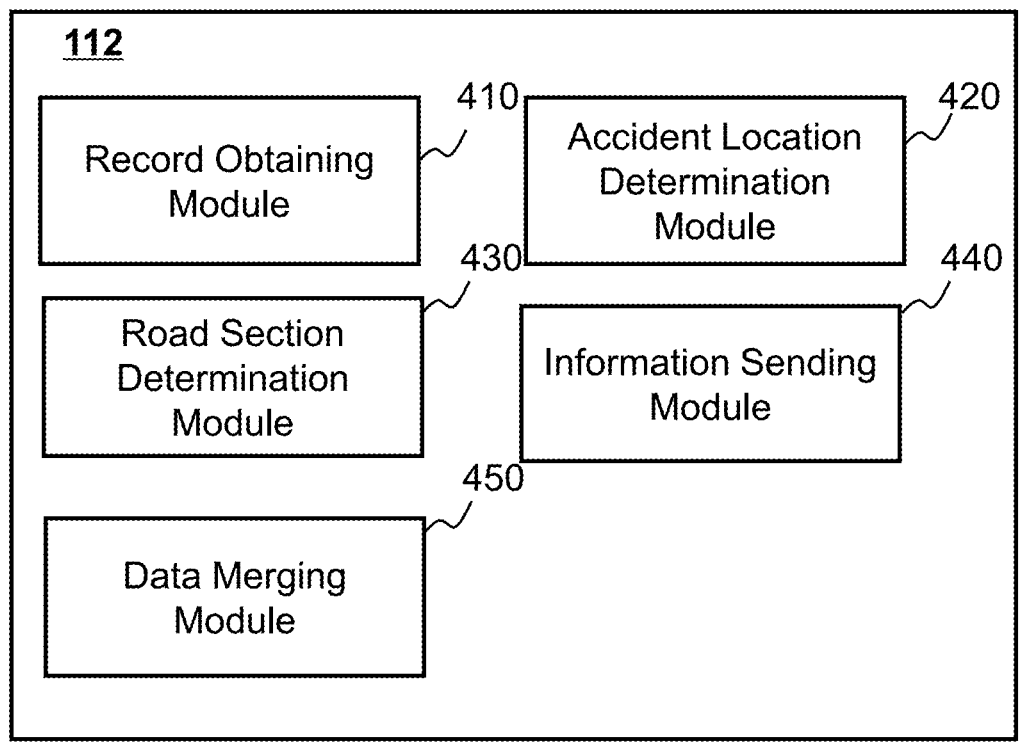
FIG. 4 is a block diagram illustrating an exemplary processing engine according to some embodiments of the present disclosure.

FIG. 4 is a block diagram illustrating an exemplary processing engine 112 according to some embodiments of the present disclosure. The processing engine 112 may include a record obtaining module 410, an accident location determination module 420, a road section determination module 430, an information sending module 440, and a data merging module 450.

The record obtaining module 410 may be configured to obtain a plurality of accident records. In some embodiments, each of the plurality of accident records is associated with a corresponding target user terminal and includes an on-record accident time and a plurality of locations that the target user terminal appeared around the on-record accident time. For example, an accident record of the plurality of accident records may record a traffic accident of a vehicle associated with a target user terminal. The on-record accident time may be a time reported by a user who witnessed the traffic accident. The plurality of historical locations that the target user terminal appeared around the on-record accident time may be obtained by matching all of historical locations of the target user terminal with the on-record accident time.

The accident location determination module 420 may be configured to determine a plurality of refined accident locations. A refined accident location may be an accurate location where the actual traffic accident happens. In some embodiments, the accident location determination module 420 may use a first clustering procedure based on the plurality of locations of a target user terminal. For example, the accident location determination module 420 may take the plurality of locations of the target user terminal as the input of the first clustering procedure. The accident location determination module 420 may assign a first result of the first clustering procedure as a refined accident location of the plurality of locations of the target user terminal. In some embodiments, the accident location determination module 420 may determine the plurality of refined accident locations for corresponding plurality of accident records. Detail descriptions of determining the plurality of refined accident locations may be found elsewhere in the present disclosure (e.g., FIGS. 5-11 and the descriptions thereof).

The road section determination module 430 may be configured to determine at least one accident-prone road section. An accident-prone road section may be an area where traffic accidents are more likely to happen than other areas. In some embodiments, the road section determination module 430 may determine the at least one accident-prone road section using a second clustering procedure with the plurality of refined accident locations corresponding to the plurality of accident records as an input. Detail descriptions of determining the plurality of refined accident locations may be found elsewhere in the present disclosure (e.g., FIGS. 5-13 and the descriptions thereof).

The information sending module 440 may be configured to send information relating to the at least one accident-prone road section to an information receiving terminal. In some embodiments, the information relating to the at least one accident-prone road section may be in a format of a plurality of electronic signals together with a triggering code. The triggering code may be configured to rend an application to generate a presentation of the at least one accident-prone road section on an interface of the information receiving terminal.

The data merging module 450 may be configured to obtain a plurality of accident reports and a plurality of historical locations of the target user terminals. The data merging module 450 may merge an on-record accident time and an on-record accident location in each accident report with the plurality of historical locations of the target user terminal to obtain an accident record associated with the corresponding target user terminal. Detail descriptions of merging data to obtain an accident record may be found elsewhere in the present disclosure (e.g., FIG. 14 and the descriptions thereof).

The modules in the processing engine 112 may be connected to or communicate with each other via a wired connection or a wireless connection. The wired connection may include a metal cable, an optical cable, a hybrid cable, or the like, or any combination thereof. The wireless connection may include a Local Area Network (LAN), a Wide Area Network (WAN), a Bluetooth, a ZigBee, a Near Field Communication (NFC), or the like, or any combination thereof. Two or more of the modules may be combined into a single module, and any one of the modules may be divided into two or more units. For example, the record obtaining module 410 and the data merging module 450 may be combined as a single module which may both merge the accident report and obtain the accident record. As another example, the processing engine 112 may include a storage module (not shown) used to store data and/or information for determining the refined accident locations and/or accident-prone road sections.

FIG. 5A is a flowchart illustrating an exemplary process for determining at least one accident-prone road section according to some embodiments of the present disclosure. The process 500 may be executed by the on-demand service AI system 100. For example, the process 500 may be implemented as a set of instructions (e.g., an application) stored in the storage ROM 230 or RAM 240. The processor 220 may execute the set of instructions, and when executing the instructions, it may be configured to perform the process 500. The operations of the illustrated process presented below are intended to be illustrative. In some embodiments, the process 500 may be accomplished with one or more additional operations not described and/or without one or more of the operations discussed. Additionally, the order in which the operations of the process as illustrated in FIG. 5A and described below is not intended to be limiting.

In process 510, the processing engine 112 (e.g., the processor 220, the record obtaining module 410) may obtain a plurality of accident records. In some embodiments, each of the plurality of accident records is associated with a corresponding target user terminal and includes an on-record accident time and a plurality of locations that the target user terminal appeared around the on-record accident time.

In some embodiments, an accident record of the plurality of accident records may record a traffic accident of a vehicle associated with a target user terminal. When the traffic accident happens, a user of the target user terminal (or a staff of an insurance company that deals with the traffic accident, a traffic police who handles the traffic accident) may report an on-record accident time and an on-record accident location. The on-record accident time may be a time reported by a user who witnessed the traffic accident. In some embodiments, the on-record accident time may be different from an actual accident time when the traffic accident happens. For example, the actual accident time is 15:00, and the on-record accident time reported by a user who witnessed the traffic accident is about 15:24. The on-record accident location may be a location reported by a user who witnessed the traffic accident. In some embodiments, the on-record accident location may be different from an actual accident location reported by a user who witnessed the traffic accident. For example, the actual accident location is an intersection of No. 1 road and No. 2 road, and the on-record accident location is around No. 1 road.

In some embodiments, the target user terminal may be a device including a positioning technology for obtaining real-time locations of the vehicle. For example, the target user terminal may be a mobile terminal of a driver or a mobile terminal of a passenger of the vehicle, a vehicle navigation system, an onboard positioning system, or the like, or any combination thereof. The real-time locations may be stored in a storage medium (e.g., the storage 140, the ROM 230, the RAM 240, etc.) of the AI system 100 as a plurality of historical locations. For example, the target user terminal may obtain a location every predetermined time period (e.g., every 5 second, every 10 seconds, every 30 seconds, etc.) and send the location and a time corresponding to the location to the storage medium. When the processing engine 112 obtains a traffic accident report of the vehicle, the processing engine 112 may access the storage medium to obtain a plurality of locations that the target user terminal appeared around the on-record accident time and/or around the on-record accident location by matching the on-record accident time and/or the on-record accident location with a plurality of historical locations. The plurality of locations that the target user terminal appeared around the on-record accident time may include the locations that the user terminal appeared during a period of time ranging from a first predetermined time period before the on-record accident time to a second predetermined time period after the on-record accident time. The first and/or second predetermined time period may be determined by the processing engine 112 and a user thereof. For example, when the on-record accident time is 15:00, the processing engine 112 may obtain a plurality of locations of the target user terminal from 14:00-16:00. The plurality of locations that the target user terminal appeared around the on-record accident location may include locations that the user terminal appeared in an area ranging from a predetermined distance from the on-record accident location. The predetermined distance may be determined by the processing engine 112 and a user thereof. For example, the on-record accident location is Crossroad 1, the processing engine 112 may obtain a plurality of locations of the target user terminal in an area ranging from 5 km from the Crossroad 1.

In process 520, the processing engine 112 (or the accident location determination module 420) may determine a plurality of refined accident locations. In some embodiments, the plurality of refined accident locations are determined using a first clustering procedure based on the plurality of locations of the target user terminal. For example, the processing engine 112 may take the plurality of locations of the target user terminal as the input of the first clustering procedure. The processing engine 112 may assign a first result of the first clustering procedure as a refined accident location of the plurality of locations of the target user terminal. In some embodiments, the refined accident location may be an accurate location where the actual traffic accident happens.

In some embodiments, the plurality of locations of the target user terminal may be mapped to a plurality of points on a map. The density of the plurality of points during a predetermined period of time may reflect a stop time of the vehicle associated with the target user terminal in the plurality of locations. For example, an area including higher-density points on the map during one hour indicates that the vehicle stops at the area longer than an area including lower-density points on the map during the same one hour.

In some embodiments, the processing engine 112 may operate the first clustering procedure based on a stop time of the corresponding vehicle. The first clustering procedure may be a mothed and/or algorithm to cluster the plurality of points corresponding to the plurality of locations of the target user terminal. For example, the processing engine 112 may input the plurality of points into the first clustering procedure. The first clustering procedure may cluster the plurality of points to obtain a cluster that includes the densest points, and select a point associated with average coordinates of the points in the cluster as the first result of the first clustering procedure. The processing engine 112 may determine a location corresponding to the selected point as the refined accident location of the target user terminal. In some embodiments, the first clustering procedure may be a density-based clustering method, such as a DBSCAN algorithm, an OPTICS algorithm, a Mean-shift algorithm, a DENCLUE algorithm, or the like, or any combination thereof. In some embodiments, an exemplary method of the first clustering procedure may be found elsewhere in the present disclosure (e.g., FIGS. 6-10 and the descriptions thereof).

In process 530, based on the determination of the plurality of refined accident locations, the processing engine 112 (or the road section determine module 430) may determine at least one accident-prone road section. In some embodiments, the at least one accident-prone road section may be determined using a second clustering procedure with the plurality of refined accident locations as an input.

In some embodiments, an accident-prone road section may be an area where traffic accidents are more likely to happen than other areas. The accident-prone road section may be an exact location (e.g., a street intersection), a road segment (e.g., from 100 meters to 300 meters of a service road prior to an expressway entrance), or the like, or any combination thereof.

In some embodiments, the plurality of refined accident locations may be mapped to a plurality of points on a map. The density of the plurality of points may reflect an amount of accidents that happened in the past. An area with a higher density of points is likely to have more traffic accidents than the areas with a lower density of points. In some embodiments, the processing engine 112 may operate the second clustering procedure using the plurality of points as an input. The second clustering procedure may be a mothed and/or algorithm to cluster the plurality of points corresponding to the plurality of refined accident locations. For example, the processing engine 112 may input the plurality of points into the second clustering procedure. The second clustering procedure may cluster the plurality of points to obtain at least one cluster that includes denser points than other clusters, and identify an area (e.g., an exact location, a road segment) for each of the at least one cluster as an accident-prone road section. In some embodiments, the processing engine 112 may identify the area based on the corresponding cluster. For example, the processing engine 112 may determine an average coordinate of the plurality of points in the at least one cluster, and assign a road segment within a predetermined distance from the average coordinate as a corresponding accident-prone road section. In some embodiments, the second clustering procedure may be a density-based clustering method, such as a DBSCAN algorithm, an OPTICS algorithm, a Mean-shift algorithm, a DENCLUE algorithm, or the like, or any combination thereof. In some embodiments, an exemplary method of the second clustering procedure may be found elsewhere in the present disclosure (e.g., FIGS. 6-11 and the descriptions thereof). The second clustering procedure may be the same method as the first clustering procedure. For example, the second clustering procedure and the first clustering procedure may be the exemplary method described in FIGS. 6-11 and the descriptions thereof. Alternatively, the second clustering procedure may be a different method as the first clustering procedure. For example, the second clustering procedure is the DBSCAN algorithm, and the first clustering method may be the exemplary method described in FIGS. 6-11 and the descriptions thereof.

Figure 5B:
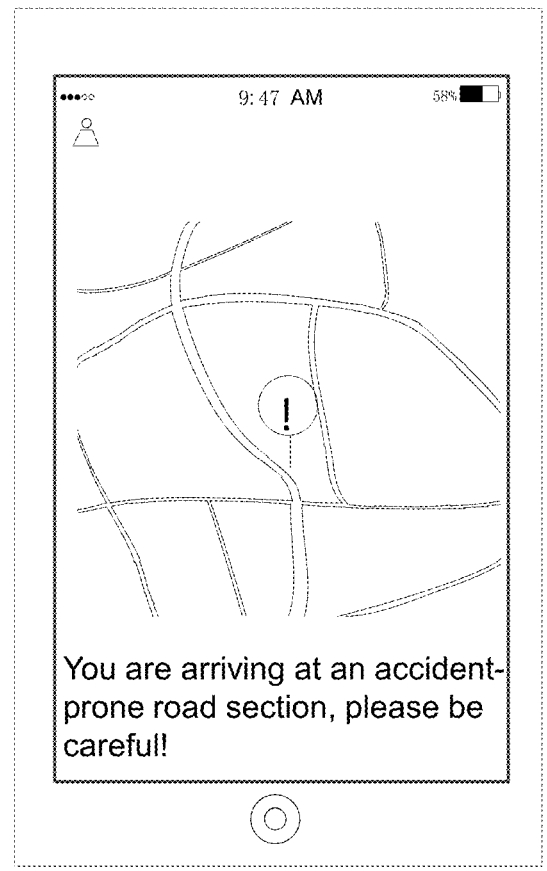
FIG. 5B is an exemplary user interface of the information receiving terminal for presenting an accident-prone road section according to some embodiments of the present disclosure.

In some embodiments, after determining the at least one accident-prone road section, the processing engine 112 (e.g., the processor 220, the information sending module 440) may generate electronic signals including the at least one accident-prone road section and a triggering code. In some embodiments, the triggering code may be in a format recognizable by an application (e.g., a transportation service application, a taxi hailing service application, a navigation service application, etc.) installed in an information receiving terminal. For example, the trigger code may be an instruction, a code, a mark, a symbol, or the like, or any combination thereof, which can activate information receiving terminal or cause the information receiving terminal to execute a computer-readable program. The triggering code may be configured to rend the application to generate a presentation of the at least one accident-prone road section on an interface of the information receiving terminal. For example, when the information receiving terminal enters an area within a predetermined distance from one of the at least one accident-prone road section, the processing engine 112 may direct the information receiving terminal to display the corresponding accident-prone road section to remind the user to drive or walk carefully. In some embodiments, the processing engine 112 (e.g., the processor 220, the information sending module 440) may send the electronic signals to the information receiving terminal via the information transmitting port of the information receiving system. In response to receiving the electronic signals, the information receiving terminal may present the accident-prone road section on the interface thereof to remind the user to be careful. FIG. 5B is an exemplary user interface of the information receiving terminal for presenting an accident-prone road section according to some embodiments of the present disclosure.

Figure 6:
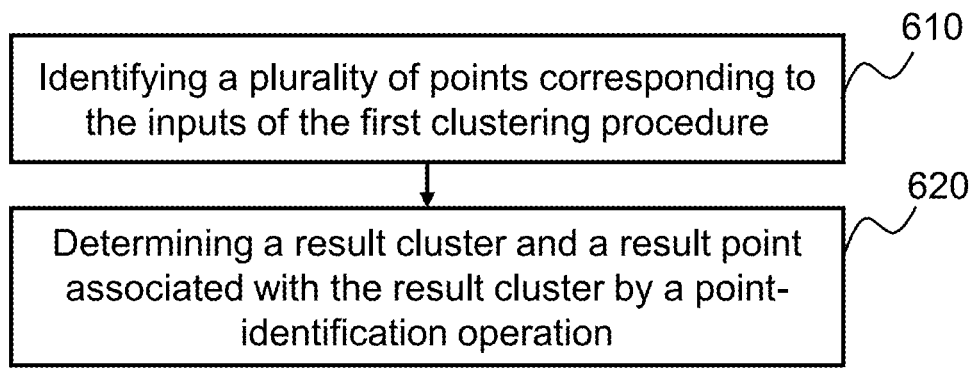
FIG. 6 is a flowchart illustrating an exemplary process for operating a first clustering procedure according to some embodiments of the present disclosure.

FIG. 6 is a flowchart illustrating an exemplary process for operating a first clustering procedure according to some embodiments of the present disclosure. The process 600 may be executed by the AI system 100. For example, the process 600 may be implemented as a set of instructions (e.g., an application) stored in the storage ROM 230 or RAM 240. The processor 220 may execute the set of instructions, and when executing the instructions, it may be configured to perform the process 600. The operations of the illustrated process presented below are intended to be illustrative. In some embodiments, the process 600 may be accomplished with one or more additional operations not described and/or without one or more of the operations discussed. Additionally, the order in which the operations of the process as illustrated in FIG. 6 and described below is not intended to be limiting.

In process 610, the processing engine 112 (e.g., the processor 220) may identify a plurality of points corresponding to the input of the first clustering procedure. In some embodiments, each of plurality of locations of the target user terminal may be mapped to a point on a map according to a coordinate of the location.

In process 620, the processing engine 112 (e.g., the processor 220) may determine a result cluster and a result point associated with the result cluster by a point-identification operation.

In some embodiments, the processing engine 112 may divide the plurality of identified points into a plurality of clusters according to some predetermined rules, and select the result cluster from the plurality of clusters. For example, the processing engine 112 may select a cluster that includes the densest points as the result cluster. In some embodiments, the processing engine 112 may determine the result point based on the points in the result cluster. For example, the processing engine 112 may determine an average coordinate or a weighted average coordinate of the points in the result cluster, and assign a point having the average coordinate or the weighted average coordinate as the result point. As another example, the processing engine 112 may determine a point in the result cluster that is nearest to the average coordinate or the weighted average coordinate as the result point. The point-identification operation may be a method or algorithm for determining the result cluster and the result points. Detail description of the point-identification operation may be found in FIG. 7 and the descriptions thereof.

Figure 7:
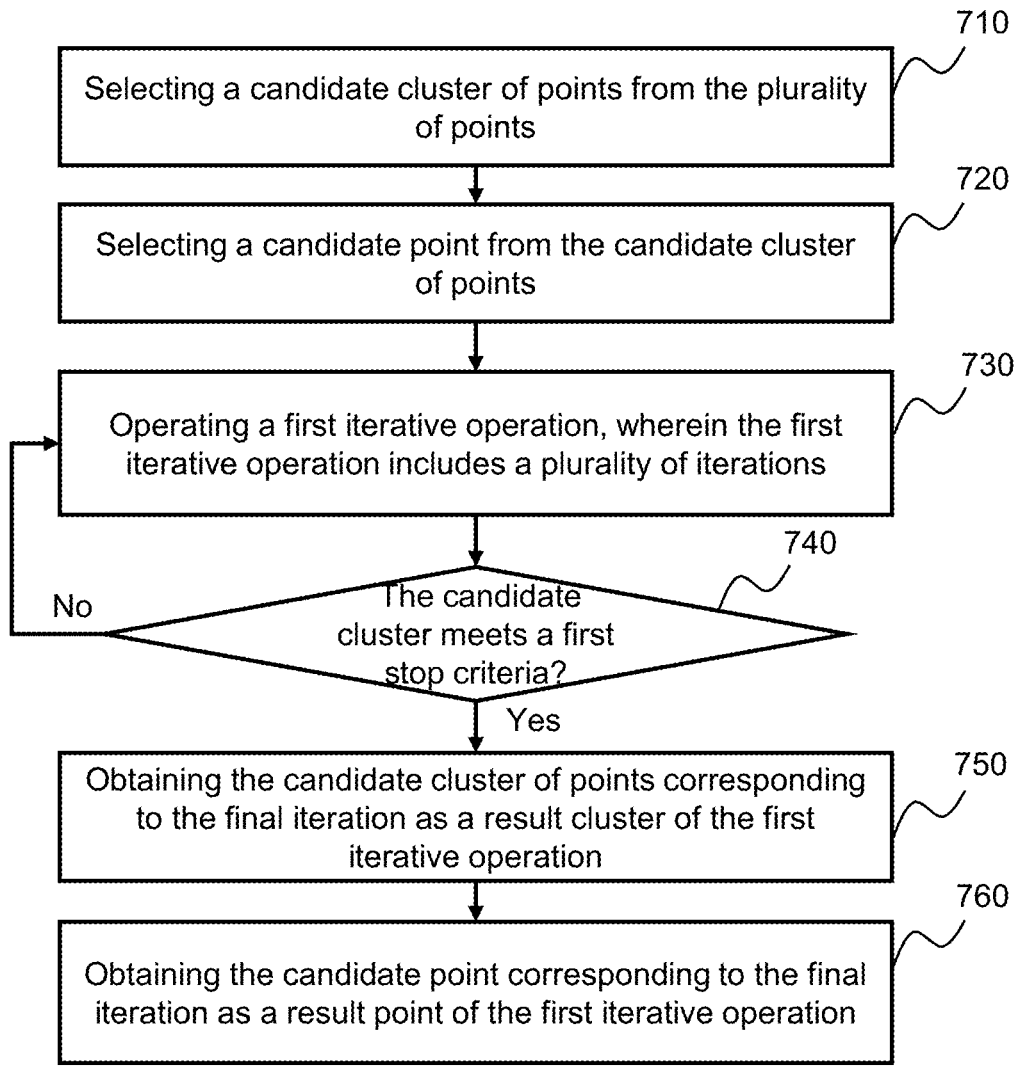
FIG. 7 is a flowchart illustrating an exemplary process for operating a point-identification operation according to some embodiments of the present disclosure.

FIG. 7 is a flowchart illustrating an exemplary process for operating a point-identification operation according to some embodiments of the present disclosure. The process 700 may be executed by the AI system 100. For example, the process 700 may be implemented as a set of instructions (e.g., an application) stored in the storage ROM 230 or RAM 240. The processor 220 may execute the set of instructions, and when executing the instructions, it may be configured to perform the process 700. The operations of the illustrated process presented below are intended to be illustrative. In some embodiments, the process 700 may be accomplished with one or more additional operations not described and/or without one or more of the operations discussed. Additionally, the order in which the operations of the process as illustrated in FIG. 7 and described below is not intended to be limiting.

In process 710, the processing engine 112 (e.g., the processor 220) may select a candidate cluster of points from the plurality of points. In some embodiments, the candidate cluster of points may include all of the plurality of points corresponding to the plurality of locations of the target user terminal. Alternatively, the candidate cluster of points may include part of the plurality of points corresponding to the plurality of locations of the target user terminal.

In process 720, the processing engine 112 (e.g., the processor 220) may select a candidate point from the candidate cluster of points. In some embodiments, the candidate point may be an average coordinate of the candidate cluster of points, a weighted average coordinate of the candidate cluster of points, or any calculated value of the candidate cluster of points. In some embodiments, the candidate point may be a point in the candidate cluster of points that is nearest to the average coordinate of the candidate cluster of points, the weighted average coordinate of the candidate cluster of points, or any calculated value of the candidate cluster of points.

In process 730, the processing engine 112 (e.g., the processor 220) may operate a first iterative operation with respect to the candidate cluster and the candidate point. In some embodiments, the first iterative operation may include a plurality of iterations.

Figure 8:
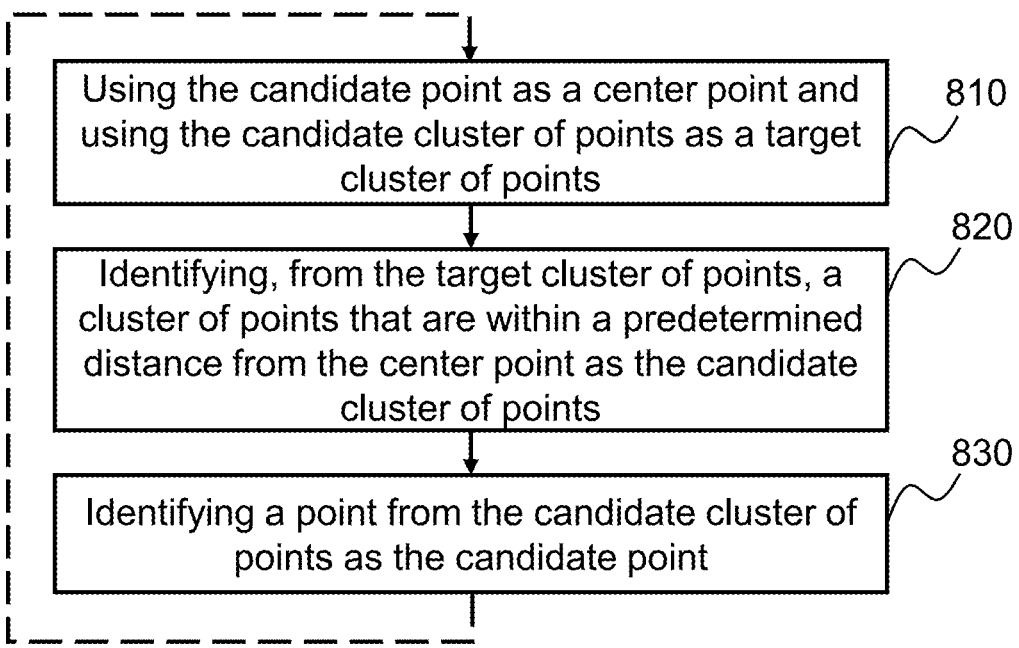
FIG. 8 is a flowchart illustrating an exemplary process for operating a first iterative operation according to some embodiments of the present disclosure.

FIG. 8 is a flowchart illustrating an exemplary process for operating a first iterative operation according to some embodiments of the present disclosure. Each of the plurality of iterations may include three processes of 810-830 in sequence.

In process 810, the processing engine 112 (e.g., the processor 220) may use the candidate point as a center point and use the candidate cluster of points as a target cluster of points. The center point may be used as a midpoint to obtain a cluster of points that is within a predetermined distance from the center point.

In process 820, the processing engine 112 (e.g., the processor 220) may identify, from the target cluster of points, a cluster of points that are within a predetermined distance from the center point as the candidate cluster of points. For example, the processing engine 112 may update the candidate cluster of points by selecting a plurality of points from the target cluster of points that are within the predetermined distance from the center point. As another example, the processing engine 112 may determine a distance of each point of the target cluster of points from the center point and select a plurality of points that the corresponding distances are within the predetermined distance to obtain the candidate cluster of points.

In some embodiments, the predetermined distance may be determined based on a vehicle type associated with the target user terminal, an average driving speed of the vehicle associated with the target user terminal, a traffic accident type of the corresponding vehicle associated with the target user terminal, or the like, or any combination thereof. For example, the predetermined distance corresponding to a car is different from the predetermined distance corresponding to an electric bicycle. The predetermined distance corresponding to the car is 15 meters, and the predetermined distance corresponding to the electric bicycle is 8 meters.

In process 830, the processing engine 112 (e.g., the processor 220) may identify a point from the candidate cluster of points as the candidate point. In some embodiments, the processing engine 112 may calculate an average coordinate of the candidate cluster of points, a weighted average coordinate of the candidate cluster of points, or any calculated value of the candidate cluster of points. The candidate point may be a point in the candidate cluster of points that is nearest to the average coordinate of the candidate cluster of points, the weighted average coordinate of the candidate cluster of points, or any calculated value of the candidate cluster of points. In some embodiments, the candidate point may be update as a point in the candidate cluster of points that is nearest to the average coordinate of the candidate cluster of points, the weighted average coordinate of the candidate cluster of points, or any calculated value of the candidate cluster of points.

After each iteration of the first iterative operation, in process 740, the processing engine 112 (e.g., the processor 220) may determine that whether the candidate cluster (or the candidate point) meets a first stop criteria. If the candidate cluster (or the candidate point) meets the first stop criteria, the processing engine 112 may proceed to the process 750. If the candidate cluster (or the candidate point) does not meet the first stop criteria, the processing engine 112 may proceed to a next iteration of the first iterative operation in the process 800 as shown in FIG. 8. For example, the processing engine 112 may proceed back to the process 810 to using the candidate point identified from the process 830 in the last iteration as a center point and using the candidate cluster of points identified from the process 820 in the last iteration as a target cluster of points to continue the iterations in the first iterative operation until the candidate cluster (or the candidate point) meets the first stop criteria.

In some embodiments, the first stop criteria may be that during the plurality of iterations in the first iterative operation, a candidate cluster (or a candidate point) generated in an iteration is the same as the candidate cluster (or the candidate point) generated in the last iteration. For example, if the candidate clusters (or the candidate points) of two continuous iterations are the same, the processing engine 112 may stop the first iterative operation to obtain a result cluster and/or a result point. In some embodiments, the first stop criteria may be that an amount of iterations in the first iterative operation is greater than a first iteration threshold. The first iteration threshold may be any value that is predetermined by the processing engine 112 or a user thereof according to different application scenes. For example, if the amount of the iterations in the first iterative operation is greater than 20, the processing engine 112 may stop the first iterative operation to obtain a result cluster and/or a result point of the first iterative operation.

In process 750, the processing engine 112 (e.g., the processor 220) may obtain the candidate cluster of the points corresponding to the final iteration as a result cluster of the first iterative operation. The final iteration may be the last iteration before the candidate cluster (or the candidate point) meets the first stop criteria. The processing engine 112 may assign the candidate cluster of the points in the final iteration as the result cluster of the first iterative operation. In some embodiments, the result cluster may be a densest cluster among the plurality of candidate clusters after the first iterative operation.

In process 760, the processing engine 112 (or the processor 220) may obtain the candidate point corresponding to the final iteration as a result point of the first iterative operation. The processing engine 112 may assign the candidate point in the final iteration as the result point of the first iterative operation. In some embodiments, the result point may be a point nearest to an average coordinate of the densest cluster.

In some embodiments, the processing engine 112 (or the processor 220) may output the result point of the first iterative operation as the first result of the first clustering procedure. The result point of the first iterative operation may be assigned as the refined accident location associated with the target user terminal. For example, the result point is a point nearest to an average coordinate of the densest cluster among the plurality of points corresponding to the plurality of locations of the user terminal. As the result cluster is the densest cluster among the plurality of candidate clusters, which indicates that traffic accident is most likely to happen in the area corresponding to the result cluster, the result point may indicate a most possible accident location where the target user terminal stops for a longest time. Therefore, the processing engine 112 may assign the result point as the refined accident location.

Figure 9:
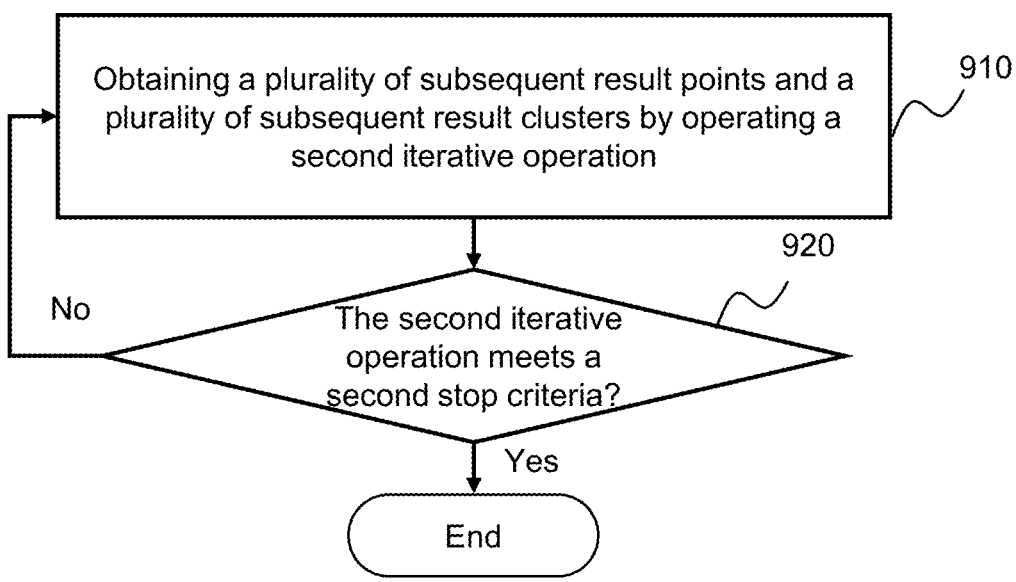
FIG. 9 is a flowchart illustrating an exemplary process for operating a first clustering procedure according to some embodiments of the present disclosure.

FIG. 9 is a flowchart illustrating an exemplary process for operating a first clustering procedure according to some embodiments of the present disclosure. The process 900 may be executed by the AI system 100. For example, the process 900 may be implemented as a set of instructions (e.g., an application) stored in the storage ROM 230 or RAM 240. The processor 220 may execute the set of instructions, and when executing the instructions, it may be configured to perform the process 900. The operations of the illustrated process presented below are intended to be illustrative. In some embodiments, the process 900 may be accomplished with one or more additional operations not described and/or without one or more of the operations discussed. Additionally, the order in which the operations of the process as illustrated in FIG. 9 and described below is not intended to be limiting.

In some embodiments, the processing engine 112 may implement the process 900 in FIG. 9 after the process 600 in FIG. 6 to further operate the first clustering procedure. The processing engine 112 may determine a plurality of result points and a plurality of result clusters by operating the first clustering procedure. In some embodiments, the result point determined in the process 620 in FIG. 6 may be one of the plurality of result points and the result cluster determined in the process 620 in FIG. 6 may be one of the plurality of result clusters.

In process 910, the processing engine 112 (or the processor 220) may obtain a plurality of subsequent result points and a plurality of subsequent result clusters based on the output of the first iterative operation by operating a second iterative operation. In some embodiments, the second iterative operation may include a plurality of iterations.

Figure 10:
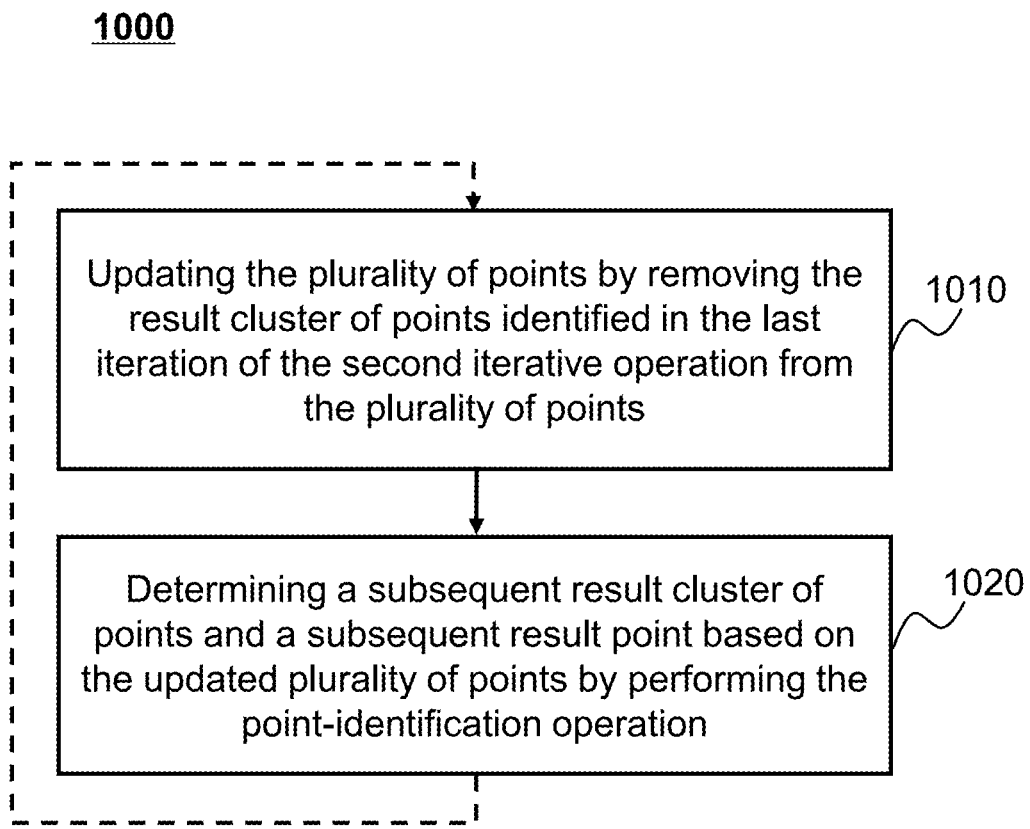
FIG. 10 is a flowchart illustrating an exemplary process for operating a second iterative operation according to some embodiments of the present disclosure.

FIG. 10 is a flowchart illustrating an exemplary process for operating a second iterative operation according to some embodiments of the present disclosure. The second iterative operation may include a plurality of iterations. Each of the plurality of iterations may include three processes of 1010-1030 in sequence.

In process 1010, the processing engine 112 (or the processor 220) may update the plurality of points by removing the result cluster of points identified in the last iteration of the second iterative operation from the plurality of points. At the initial step, the plurality of points may be updated to remove the result cluster of points identified in the first iterative operation (as shown in the process 760 in FIG. 7). Further, the plurality of points may be updated to remove the result cluster of points identified in the last iteration of the second iterative operation.

In process 1020, the processing engine 112 (or the processor 220) may determine a subsequent result cluster of points and a subsequent result point based on the updated plurality of points by performing the point-identification operation as illustrated in FIGS. 7-8. The subsequent result cluster of points identified in an iteration of the second iterative operation may have less density than the result cluster of points identified in the prior iteration of the second iterative operation. Therefore, by performing the second iterative operation, i.e., by iteratively updating the plurality of points to remove the result cluster of points identified from a prior iteration, one or more subsequent result clusters of points and one or more subsequent result points may be obtained. Further, the one or more subsequent result clusters sequentially identified during the iterations of the second iterative operation may be in a descending order with respect to the density.

In process 920, the processing engine 112 (or the processor 220) may determine whether the second iterative operation meets a second stop criteria. If the second iterative operation meets the second stop criteria, the processing engine 112 may stop the second iterative operation. If the second iterative operation does not meet the second stop criteria, the processing engine 112 may continue the iterations (e.g., the processes 1010-1020) until the second iterative operation meets the second stop criteria.

In some embodiments, the second stop criteria may be that during the plurality of iterations in the second iterative operation, a candidate cluster (or a candidate point) generated in an iteration is the same as the candidate cluster (or the candidate point) generated in the last iteration. For example, if the candidate clusters (or the candidate points) of two continuous iterations are the same, the processing engine 112 may stop the second iterative operation. In some embodiments, the second stop criteria may be that an amount of iterations in the second iterative operation is greater than a second iteration threshold. The second iteration threshold may be any value that is predetermined by the processing engine 112 or a user thereof according to different application scenes. For example, if the amount of the iterations in the second iterative operation is greater than 10, the processing engine 112 may stop the second iterative operation to obtain a result point of the remainder of the plurality of result points and a result cluster of the remainder of the plurality of result clusters.

Figure 11:
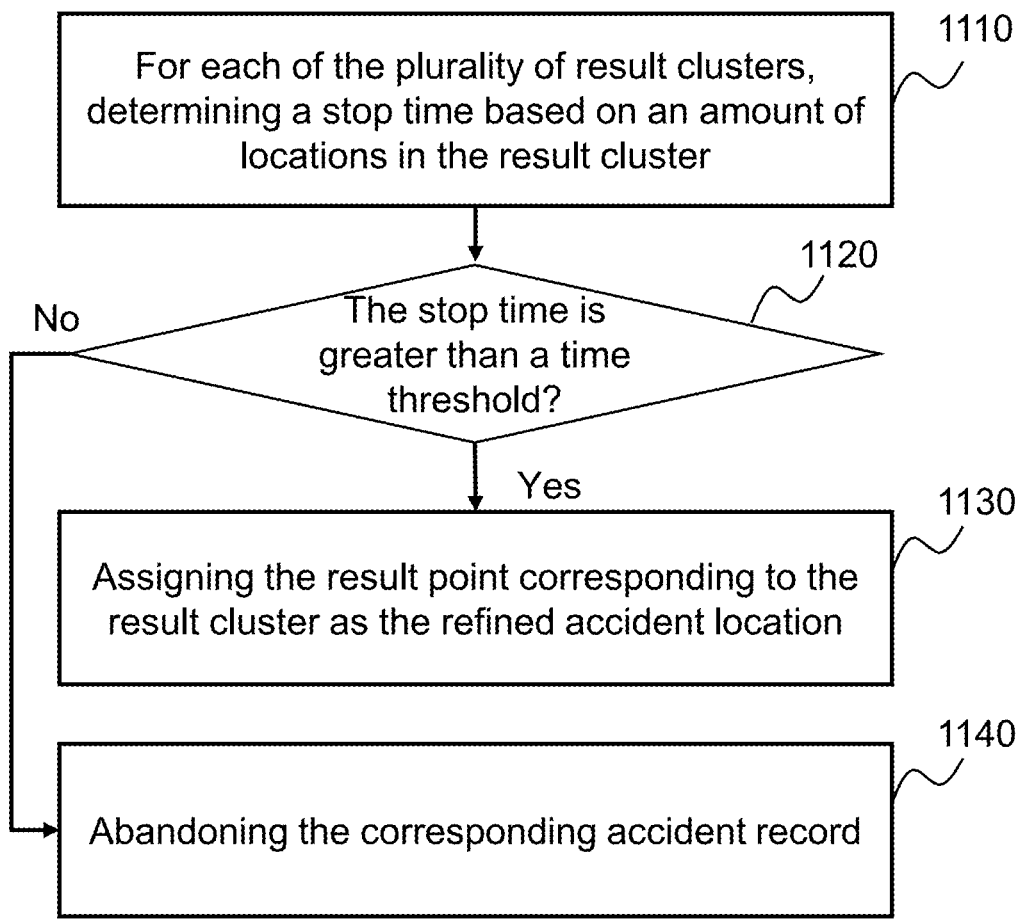
FIG. 11 is a flowchart illustrating an exemplary process for determining a refined accident location according to some embodiments of the present disclosure.

FIG. 11 is a flowchart illustrating an exemplary process for determining a refined accident location according to some embodiments of the present disclosure. The process 1100 may be executed by the AI system 100. For example, the process 1100 may be implemented as a set of instructions (e.g., an application) stored in the storage ROM 230 or RAM 240. The processor 220 may execute the set of instructions, and when executing the instructions, it may be configured to perform the process 1100. The operations of the illustrated process presented below are intended to be illustrative. In some embodiments, the process 1100 may be accomplished with one or more additional operations not described and/or without one or more of the operations discussed. Additionally, the order in which the operations of the process as illustrated in FIG. 11 and described below is not intended to be limiting.

In process 1110, for each of the plurality of result clusters, the processing engine 112 (or the processor 220) may determine a stop time based on an amount of points in the result cluster. The stop time may be a time duration that the target user terminal stops at an area associated with the result cluster. For example, when the target user terminal obtains one point of a location at the area corresponding to the result cluster every 5 seconds, and the amount of points in the result cluster corresponding to the locations of the target user terminal is 200. The processing engine may calculate the stop time associated with the result cluster is 1000 seconds (200*5).

In process 1120, the processing engine 112 (or the processor 220) may determine whether the stop time associated with the result cluster is greater than a time threshold. In some embodiments, the time threshold may be predetermined by the processing engine 112 or a user thereof according to different application scenes. For example, the time threshold may be determined based on a traffic condition of a road where the vehicle is. As another example, the time threshold may be determined based on a longest waiting time of a traffic light. In some embodiments, the determination that the stop time is greater than the time threshold may cause the processing engine 112 to remove the result clusters with vehicles having a short stay or only waiting for the traffic light.

In some embodiments, if the stop time associated with the result cluster is greater than the time threshold, the processing engine 112 may proceed to process 1130. If the stop time associated with the result cluster is not greater than the time threshold, the processing engine 112 may proceed to process 1140.

In process 1130, the processing engine 112 (or the processor 220) may assign the result point corresponding to the result cluster as the refined accident location. For example, when the vehicle stops for an enough long time in an area, the processing engine 112 may predict that there is a traffic accident in the area. Therefore, the processing engine 112 may assign the result point corresponding to the result cluster as the refined accident location.

In process 1140, the processing engine 112 (or the processor 220) may abandon the corresponding accident record to proceed to another accident record of another target user terminal. For example, when the vehicle stops only a short time in an area, the processing engine 112 may predict that there is not a traffic accident in the area. In some embodiments, the processing engine 112 may proceed to another accident record of another target user terminal according to the method described in FIGS. 6-11 in the present disclosure.

Figure 12:
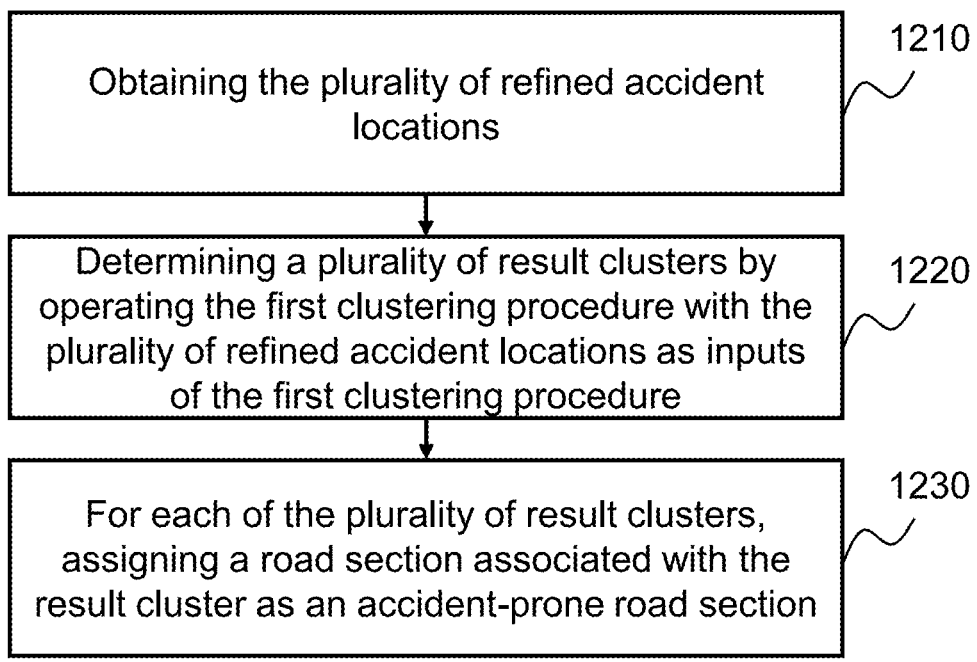
FIG. 12 is a flowchart illustrating an exemplary process for determining at least one accident-prone road section according to some embodiments of the present disclosure.

FIG. 12 is a flowchart illustrating an exemplary process for determining at least one accident-prone road section according to some embodiments of the present disclosure. The process 1200 may be executed by the AI system 100. For example, the process 1200 may be implemented as a set of instructions (e.g., an application) stored in the storage ROM 230 or RAM 240. The processor 220 may execute the set of instructions, and when executing the instructions, it may be configured to perform the process 1200. The operations of the illustrated process presented below are intended to be illustrative. In some embodiments, the process 1200 may be accomplished with one or more additional operations not described and/or without one or more of the operations discussed. Additionally, the order in which the operations of the process as illustrated in FIG. 12 and described below is not intended to be limiting.

In process 1210, the processing engine 112 (or the processor 220) may obtain the plurality of refined accident locations. In some embodiments, the plurality of refined accident locations may be determined by operating the first cluster procedure as described in FIGS. 6-11 in the present disclosure. In some embodiments, the plurality of refined accident locations may be predetermined and stored in a storage medium (e.g., the storage 140, the ROM 230, the RAM 240, etc.) of the AI system 100.

In process 1220, the processing engine 112 (or the processor 220) may determine a plurality of result clusters by operating the second clustering procedure with the plurality of refined accident locations as inputs of the second clustering procedure.

In some embodiments, the second clustering procedure may be the same as the first clustering procedure. For example, the processing engine 112 may identify a plurality of points corresponding to the plurality of refined accident locations on the map. The processing engine 112 may determine a result cluster by the point-identification operation. For example, the processing engine 112 may select a candidate cluster of points from the plurality of points corresponding to the plurality of refined accident locations. The candidate cluster of points may include all of the plurality of points or part of the plurality of points. The processing engine 112 may select a candidate point from the candidate cluster of points. The candidate point may be any value calculated based on the candidate cluster of points, such as an average coordinate, a weighted average coordinate, or the like, or any combination thereof. The processing engine 112 may operate the first iterative operation including a plurality of iterations until the first stop criteria is met. During each iteration of the first iterative operation, the processing engine 112 may use the candidate point generated in the last iteration as a center point and use the candidate cluster generated in the last iteration as a target cluster of points, identify from the target cluster of points, a cluster of points that are within a predetermined distance from the center point as the candidate cluster of points, and identify a point from the candidate cluster of points as the candidate point. The candidate cluster of points may be updated to a new cluster of points that are within the predetermined distance from the center point. In some embodiments, the predetermined distance may be predetermined by the processing engine 112 or a user thereof. For example, the predetermined distance may be determined based on an area corresponding to the refined accident locations, a road type of a road corresponding to the refined accident locations, or the like, or any combination thereof. Merely by way of example, the predetermined distance may be 300 meters, 500 meters, 1000 meters, etc. If the candidate cluster of points identified in a final iteration of the first iterative operation meets the first stop criteria, the processing engine 112 may obtain the candidate cluster of points corresponding to the final iteration as a result cluster of the first iterative operation. In addition, the processing engine 112 may operate a second iterative operation including a plurality of iterations until a second stop criteria is met to obtain remainder of the plurality of result clusters. During each iteration of the second iterative operation, the processing engine 112 may remove the result cluster of points identified in the first iterative operation from the plurality of points to update the plurality of points, and determine another cluster of a plurality of result clusters by the point-identification operation described above. After a plurality of iterations to determine the plurality of result clusters, the processing engine 112 may obtain the clusters of refined accident locations in a descending order of density of the refined accident locations. The first result cluster may be a densest cluster of refined accident locations, which may indicate that traffic accidents are more likely to happen at a road section associated with the first result cluster.

In process 1230, for each of the plurality of result clusters, the processing engine 112 (or the processor 220) may assign a road section associated with the result cluster as an accident-prone road section.

In some embodiments, the road section may be a place or an area on a road. In some embodiments, the processing engine 112 may determine the road section based on the result cluster. For example, the processing engine 112 may calculate a center point of the result cluster of points, and assign a place around the center point as the accident-prone road section. As another example, the processing engine 112 may assign an area that is within a predetermined distance from the center point as the accident-prone road section. The predetermined distance may be determined according to different application scenes. For example, the area that is within 500 meters from the center point may be assigned as the accident-prone road section.

Figure 13:
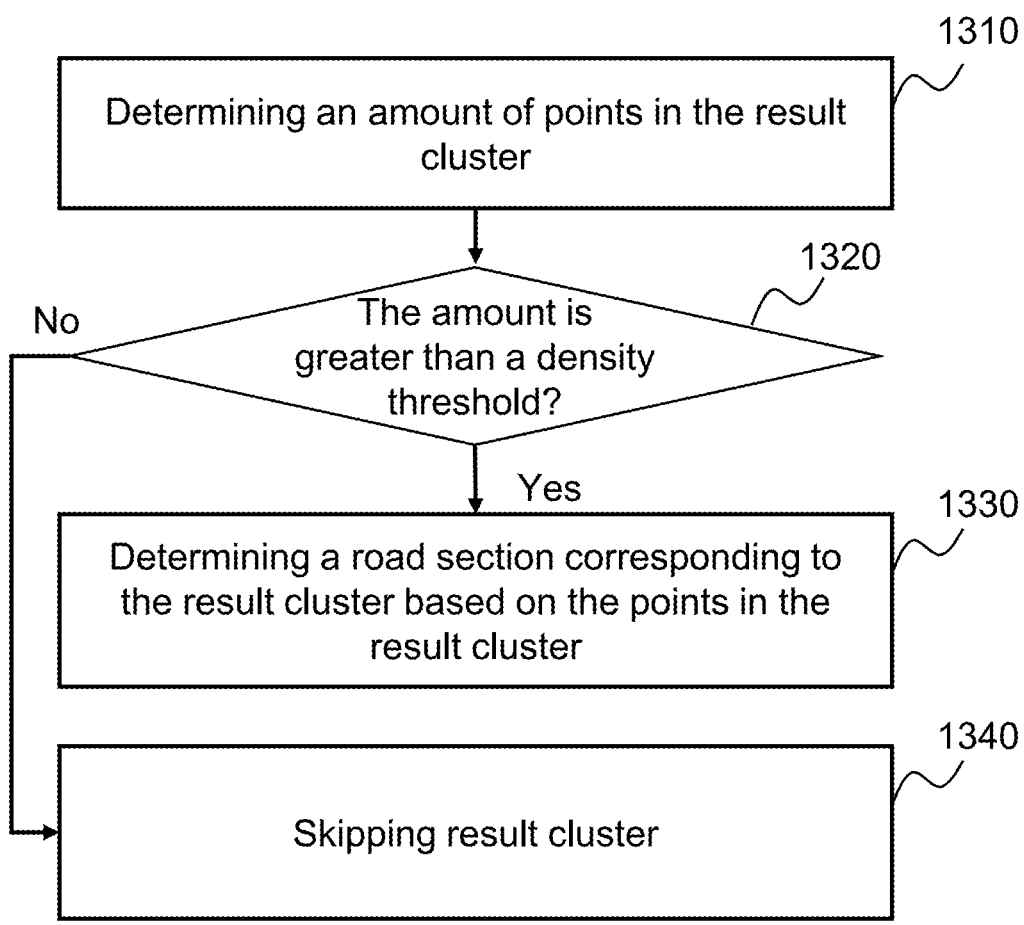
FIG. 13 is a flowchart illustrating an exemplary process for determining at least one accident-prone road section according to some embodiments of the present disclosure.

FIG. 13 is a flowchart illustrating an exemplary process for determining at least one accident-prone road section according to some embodiments of the present disclosure. The process 1300 may be executed by the AI system 100. For example, the process 1300 may be implemented as a set of instructions (e.g., an application) stored in the storage ROM 230 or RAM 240. The processor 220 may execute the set of instructions, and when executing the instructions, it may be configured to perform the process 1300. The operations of the illustrated process presented below are intended to be illustrative. In some embodiments, the process 1300 may be accomplished with one or more additional operations not described and/or without one or more of the operations discussed. Additionally, the order in which the operations of the process as illustrated in FIG. 13 and described below is not intended to be limiting.

In process 1310, for each of the plurality of result clusters, the processing engine 112 (or the processor 220) may determine an amount of points in the result cluster. In some embodiments, the amount of points may indicate a frequency of traffic accidents. The greater the amount of points is, the higher the frequency of traffic accidents is.

In process 1320, the processing engine 112 (or the processor 220) may determine whether the amount is greater than a density threshold. In some embodiments, the density threshold may be predetermined by the processing engine 112 or a user thereof according to different application scenes. For example, the density threshold may be determined based on a road type of a road corresponding to the result cluster of points. As another example, the density threshold may be a value that is not less than 2. That is to say, if there are two or more refined traffic accident locations in the result cluster, the area corresponding to the result cluster may be an accident-prone area.

In some embodiments, if the amount is greater than the density threshold, the processing engine 112 may proceed to process 1330. If the amount is not greater than the density threshold, the processing engine 112 may proceed to process 1340.

In process 1330, the processing engine 112 (or the processor 220) may determine a road section corresponding to the result cluster based on the points in the result cluster. For example, if the amount of points in the result cluster is high enough, which indicates that the frequency of traffic accidents happening at the road section corresponding to the result cluster of points is high, the processing engine 112 may predict the corresponding road section is an accident-prone road section.

In process 1340, the processing engine 112 (or the processor 220) may skip the result cluster. For example, if the amount of points in the result cluster is low, which indicates that the frequency of traffic accidents happening at the road section corresponding to the result cluster of points is low, the processing engine 112 may predict the corresponding road section is not an accident-prone road section, and proceed to another result cluster to determine whether there is an accident-prone road section.

Figure 14:
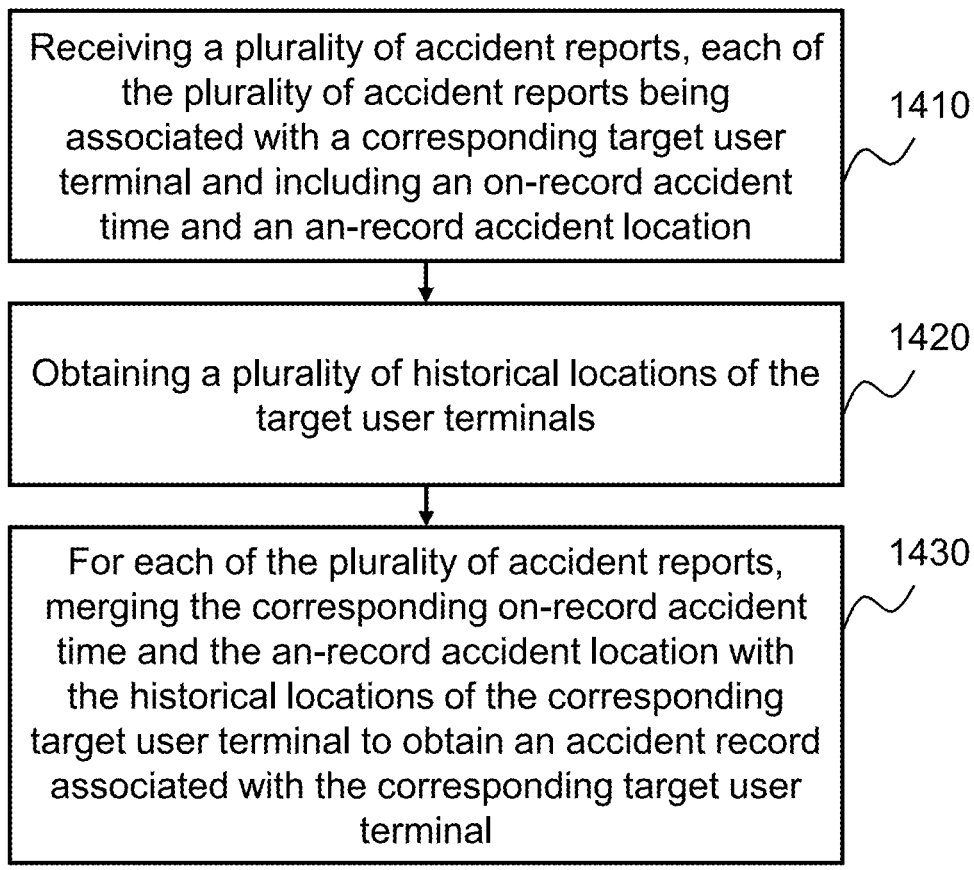
FIG. 14 is a flowchart illustrating an exemplary process for obtaining a plurality of accident records according to some embodiments of the present disclosure.

FIG. 14 is a flowchart illustrating an exemplary process for obtaining a plurality of accident records according to some embodiments of the present disclosure. The process 1400 may be executed by the AI system 100. For example, the process 1400 may be implemented as a set of instructions (e.g., an application) stored in the storage ROM 230 or RAM 240. The processor 220 may execute the set of instructions, and when executing the instructions, it may be configured to perform the process 1400. The operations of the illustrated process presented below are intended to be illustrative. In some embodiments, the process 1400 may be accomplished with one or more additional operations not described and/or without one or more of the operations discussed. Additionally, the order in which the operations of the process as illustrated in FIG. 14 and described below is not intended to be limiting.

In process 1410, the processing engine 112 (or the processor 220, the data merging module 450) may receive a plurality of accident reports. In some embodiments, each of the plurality of accident reports is associated with a corresponding target user terminal and includes an on-record accident time and an on-record accident location.

In some embodiments, when an traffic accident happens, a user of the target user terminal (e.g., a driver of a vehicle that happens the traffic accident, a passenger of the vehicle, a staff of an insurance company that deals with the traffic accident, a traffic police who handles the traffic accident, or a witness of the accident) may report the accident to seek an insurance services, roadside assistance, ambulant service, firetruck assistant or the like, or any combination thereof. The accident report may include an on-record accident time and an on-record accident location. The on-record accident time may be a time reported by the user of the user terminal. In some embodiments, the on-record accident time may be different from an actual accident time when the traffic accident happens. For example, the actual accident time is 15:00, and the on-record accident time reported by the user is about 15:24. The on-record accident location may be a location reported by the user of the user terminal. In some embodiments, the on-record accident location may be different from an actual accident location reported by the user of the user terminal. For example, the actual accident location is an intersection of No. 1 road and No. 2 road, and the on-record accident location is around No. 1 road.

In process 1420, the processing engine 112 (or the processor 220, the data merging module 450) may obtain a plurality of historical locations of the target user terminals.

In some embodiments, the target user terminal may be a device including a positioning technology for obtaining real-time locations of the vehicle. For example, the target user terminal may be a mobile terminal of a driver or a mobile terminal of a passenger of the vehicle, a vehicle navigation system, an onboard positioning system, or the like, or any combination thereof. The real-time locations may be stored in a storage medium (e.g., the storage 140, the ROM 230, the RAM 240, etc.) of the AI system 100 as a plurality of historical locations. For example, the target user terminal may obtain a location every predetermined time period (e.g., every 5 second, every 10 seconds, every 30 seconds, etc.) and send the location and a time when corresponding to the location to the storage medium.

In process 1430, for each of the plurality of accident reports, the processing engine 112 (or the processor 220, the data merging module 450) may merge the corresponding on-record accident time and the an-record accident location with the historical locations of the corresponding target user terminal to obtain an accident record associated with the corresponding target user terminal.

When the processing engine 112 obtains a traffic accident report of the vehicle, the processing engine 112 may access the storage medium to obtain a plurality of locations that the target user terminal appeared around the on-record accident time and/or around the on-record accident location by matching the on-record accident location to a plurality of historical locations. The plurality of locations that the target user terminal appeared around the on-record accident time may include the locations that the user terminal appeared during a period of time ranging from a first predetermined time period before the on-record accident time to a second predetermined time period after the on-record accident time. The first and/or second predetermined time period may be determined by the processing engine 112 and a user thereof. For example, when the on-record accident time is 15:00, the processing engine 112 may obtain a plurality of locations of the target user terminal from 14:00-16:00. The plurality of locations that the target user terminal appeared around the on-record accident location may include locations that the user terminal appeared in an area ranging from a predetermined distance from the on-record accident location. The predetermined distance may be determined by the processing engine 112 and a user thereof. For example, the on-record accident location is Crossroad 1, the processing engine 112 may obtain a plurality of locations of the target user terminal in an area ranging from 5 km from the Crossroad 1.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment," "one embodiment," or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "block," "module," "engine," "unit," "component," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB. NET, Python or the like, conventional procedural programming languages, such as the "C" programming language, Visual Basic, Fortran 1703, Perl, COBOL 1702, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a software as a service (SaaS).

Furthermore, the recited order of processing elements or sequences, or the use of numbers, letters, or other designations, therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software-only solution—e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

In some embodiments, the numbers expressing quantities or properties used to describe and claim certain embodiments of the application are to be understood as being modified in some instances by the term "about," "approximate," or "substantially." For example, "about," "approximate," or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting affect as to the broadest scope of the claims now or later associated with the present document. By way of example, should there be any inconsistency or conflict between the descriptions, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and describe.

I claim:

1. An artificial intelligent system of one or more electronic devices for predicting traffic accident locations, comprising:
  at least one information receiving port of an information providing system to receive a plurality of accident records of a plurality of traffic accidents, each of the plurality of accident records, being associated with a corresponding target user terminal,
  at least one information transmitting port of an information receiving system to transmit signals to at least one information receiving terminal, wherein the at least one information receiving terminal operates an application installed therein to response to the signals;
  at least one storage medium including a first operation system and a set of instructions compatible with the first operation system for providing an accident-prone road section to the at least one information receiving terminal; and
  at least one processor in communication with the storage medium, wherein when executing the first operation system and the set of instructions, the at least one processor is directed to:
    obtain the plurality of accident records received from the at least one information receiving port;
    tracking and receiving, in real-time, a plurality of historical locations of the target user terminal every predetermined time period acquired from at least one GPS system of the information providing system through a network;
    storing the plurality of historical locations and times corresponding to the plurality of historical location in the at least one storage medium;
    accessing the at least one storage medium to obtain a plurality of locations of the target user terminal that appeared around an on-record accident time, included in the plurality of accident records, and/or around an on-record accident location, included also in the plurality of accident records, by matching the on-record accident time and/or the on-record accident location with the plurality of historical locations;
    determine a plurality of refined accident locations by, for each of the plurality of accident records,
      operating a first clustering procedure with the plurality of locations of the target user terminal as inputs of the first clustering procedure and assigning a first result of the first clustering procedure as a refined accident location of the plurality of locations of the target user terminal, wherein the first clustering procedure is conducted on processed locations of the plurality of locations;
    in response to the determination of the plurality of refined accident locations, determine at least one accident-prone road section by operating a second clustering procedure with the plurality of refined accident locations corresponding to the plurality of accident records as the inputs of the second clustering procedure;
    in response to the determination of the at least one accident-prone road section, generate electronic signals including information of one of the at least one accident-prone road section and a triggering code, wherein the triggering code:
      is in a format recognizable by the application installed in the information receiving terminal, and
      configured to render the application to generate a presentation of the at least one accident-prone road section on an interface of the information receiving terminal; and
    direct the information receiving terminal to display the interface to present the accident-prone road section by sending the electronic signals to the information transmitting port,
  wherein the operating the first clustering procedure including:
    identify a plurality of points corresponding to the inputs;
    determine a result cluster and a result point associated with the result cluster by a point-identification operation, including:
      selecting a candidate cluster of points from the plurality of points;
      selecting a candidate point from the candidate cluster of points;
      operating a first iterative operation until a first stop criteria is met, wherein the first iterative operation includes a plurality of first iterations, and each of the first iteration includes:
        using the candidate point as a center point and using the candidate cluster of points as a target cluster of points;
        identifying, from the target cluster of points, a cluster of points that is within a predetermined distance from the center point as the candidate cluster of points; and
        identifying a point from the candidate cluster of points as the candidate point; and
  wherein the second clustering procedure includes the first clustering procedure; and to the determine at least one accident prone road section includes:
    obtain the plurality of refined accident locations;
    determine a plurality of result clusters by operating the second clustering procedure with the plurality of refined accident locations as inputs of the second clustering procedure; and
    for each of the plurality of result clusters, assign a road section corresponding to the result cluster as an accident-prone road section.

2. The system of claim 1, wherein in each of the first iteration, the candidate point in the first iteration is associated with average coordinates of the corresponding candidate cluster of points in the first iteration.

3. The system of claim 2, wherein the candidate point is a point in the candidate cluster of points that is nearest to the average coordinate of the candidates cluster of points, a weighted average coordinates of the candidate cluster of points, or any calculated value of the candidate cluster of points.

4. The system of claim 1, wherein the at least one processor is further directed to:
  upon (a determination) that the candidate cluster of points identified in a final first iteration of the first iterative operation meets the first stop criteria,
    obtain the candidate cluster of points corresponding to the final first iteration as a result cluster of the first iterative operation; and
    obtain the candidate point corresponding to the final first iteration as a result point of the first iterative operation.

5. The system of claim 4, wherein the at least one processor is further directed to output the result point of the first iterative operation as the first result of the first clustering procedure.

6. The system of claim 4, wherein the result point is one of a plurality of result points and the result cluster is one of a plurality of result clusters; and
  the at least one processor is further directed to obtain a plurality of subsequent result points and a plurality of subsequent result clusters based on the output of the first iterative operation by operating a second iterative operation until a second stop criteria is met, wherein the second iterative operation includes a plurality of second iterations, and each of the second iteration includes:
    updating the plurality of points by removing the result cluster of locations identified in the last iteration of the second iterative operation from the plurality of points;
    determining a subsequent result cluster of points and a subsequent result point based on the updated plurality of points by performing the point-identification operation.

7. The system of claim 6, wherein the at least one processor is further directed to:
  for each of the plurality of result clusters,
    determine a stop time based on an amount of points in the result cluster;
    determine whether the stop time associated with the candidate result cluster is greater than a time threshold; and
    in response to that the stop time is greater than the time threshold, assign the result point corresponding to the candidate result cluster as the refined accident location.

8. The system of claim 1, wherein the at least one processor is further directed to:
  for each of the plurality of result clusters,
    determine an amount of points in the result cluster;
    determine whether the amount is greater than a density threshold; and
    in response that the amount is greater than the density threshold, determine a road section associated with the result cluster based on the points in the result cluster.

9. The system of claim 1, wherein to obtain the plurality of accident records, the at least one processor is further directed to:
  receive a plurality of accident reports, each of the plurality of accident reports being associated with a corresponding target user terminal and including an on-record accident time and an an-record accident location;
  obtain a plurality of historical locations of the target user terminals;
  for each of the plurality of accident reports, merge the corresponding on-record accident time and the an-record accident location with the historical locations of the corresponding target user terminal to obtain an accident record associated with the corresponding target user terminal.

10. The system of claim 9, wherein each of the plurality of accident reports includes at least one of:
  an accident report reported by a user of a target user terminal;
  an accident report reported by an insurance company; or
  an accident report reported by a traffic police.

11. The system of claim 1, further select a cluster that includes densest points as the result cluster.

12. A method for predicting traffic accident locations, implemented on one or more electronic devices having at least one information receiving port of an information providing system, at least one information transmitting port of an information receiving system, at least one storage medium, and at least one processor in communication with the storage medium, comprising:
  obtaining a plurality of accident records of a plurality of traffic accidents received from the at least one information receiving port, each of the plurality of accident records being associated with a corresponding target user terminal:
  tracking and receiving a plurality of historical locations of the target user terminal every predetermined time period acquired from at least one GPS system of the information providing system through a network:
  storing the plurality of historical locations and times corresponding to the plurality of historical locations in the at least one storage medium;
  accessing the at least one storage medium to obtain a plurality of locations of the target user terminal that appeared around an on-record accident time, included in the plurality of accident records, and/or around an on-record accident location, included also in the plurality of accident records, by matching the on-record accident time and/or the on-record accident location with the plurality of historical locations;
  determining a plurality of refined accident locations by, for each of the plurality of accident records,
    operating a first clustering procedure with the plurality of locations of the target user terminal as inputs of the first clustering procedure and assigning a first result of the first clustering procedure as a refined accident location of the plurality of locations of the target user terminal, wherein the first clustering procedure is conducted on processed locations of the plurality of locations;
  in response to the determination of the plurality of refined accident locations, determining at least one accident-prone road section by operating a second clustering procedure with the plurality of refined accident locations corresponding to the plurality of accident records as the inputs of the second clustering procedure;
  in response to the determination of the at least one accident-prone road section, generating electronic signals including information of one of the at least one accident-prone road section and a triggering code, wherein the triggering code:
    is in a format recognizable by the application installed in the information receiving terminal, and configured to render the application to generate a presentation of the at least one accident-prone road section on an interface of the information receiving terminal; and directing the information receiving terminal to display the interface to present the accident-prone road section by sending the electronic signals to the information transmitting port, wherein the operating the first clustering procedure includes:

identifying a plurality of points corresponding to the inputs;

determining a result cluster and a result point associated with the result cluster by a point-identification operation, including:

selecting a candidate cluster of points from the plurality of points;

selecting a candidate point from the candidate cluster of points;

operating a first iterative operation until a first stop criteria is met. wherein the first iterative operation includes a plurality of first iterations, and each of the first iteration includes:

using the candidate point as a center point and using the candidate cluster of points as a target cluster of points;

identifying, from the target cluster of points, a cluster of points that is within a predetermined distance from the center point as the candidate cluster of points; and identifying a point from the candidate cluster of points as the candidate point;

wherein the second clustering procedure includes the first clustering procedure; and the determining the at least one accident-prone road section includes:

obtaining the plurality of refined accident locations;

determining a plurality of result clusters by operating the second clustering procedure with the plurality of refined accident locations as inputs of the second clustering procedure; and for each of the plurality of result clusters, assigning a road section associated with the result cluster as an accident-prone road section.

13. The method of claim 12, wherein in each of the first iteration, the candidate point in the first iteration is associated with average coordinates of the corresponding candidate duster of points in the first iteration.

14. The method of claim 13, wherein the candidate point is a point in the candidate cluster of points that is nearest to the average coordinates of the candidate cluster of points, a weighted average coordinates of the candidate cluster of points, or any calculated value of the candidate cluster of points.

15. The method of claim 12 further comprising:

upon that the candidate cluster of points identified in a final first iteration of the first iterative operation meets the first stop criteria, obtaining the candidate cluster of points corresponding to the final first iteration as a result cluster of the first iterative operation; and obtaining the candidate point corresponding to the final first iteration as a result point of the first iterative operation.

16. The method of claim 15 further comprising outputting the result point of the first iterative operation as the first result of the first clustering procedure.

17. The method of claim 15, wherein the result point is one of a plurality of result points and the result cluster is one of a plurality of result clusters; and the method further includes:

obtaining a plurality of subsequent result points and a plurality of subsequent result clusters based on the output of the first iterative operation by operating a second iterative operation until a second stop criteria is met, wherein the second iterative operation includes a plurality of second iterations, and each of the second iteration includes:

updating the plurality of points by removing the result cluster of locations identified in the last iteration of the second iterative operation from the plurality of points;

determining a subsequent result cluster of points and a subsequent result point based on the updated plurality of points by performing the point-identification operation.

18. The method of claim 12, wherein the obtaining the plurality of accident records includes:

receiving a plurality of accident reports, each of the plurality of accident reports being associated with a corresponding target user terminal and including an on-record accident time and an an-record accident location;

obtaining a plurality of historical locations of the target user terminals;

for each of the plurality of accident reports, merging the corresponding on-record accident time and the an-record accident location with the historical locations of the corresponding target user terminal to obtain an accident record associated with the corresponding target user terminal.

19. The method of claim 12, further selecting a cluster that includes densest points as the result cluster.

20. A non-transitory computer readable medium, comprising an operation system and at least one set of instructions compatible with the operation system for predicting traffic accident locations, wherein when executed by at least one processor of one or more electronic device, the at least one set of instructions directs the at least one processor to:

obtain a plurality of accident records of a plurality of traffic accidents, each of the plurality of accident records being associated with a corresponding target user terminal tracking and receiving a plurality of historical locations of the target user terminal every predetermined time period acquired from at least one GPS system of the information providing system through a network;

storing the plurality of historical locations and times corresponding to the plurality of historical locations in at least one storage medium;

accessing the at least one storage medium to obtain a plurality of locations of the target user terminal that appeared around an on-record accident time, included in the plurality of accident records, and/or around an on-record accident location, included also in the plurality of accident records, by matching the on-record accident time and/or the on-record accident location with the plurality of historical locations;

determine a plurality of refined accident locations by, for each of the plurality of accident records, operating a first clustering procedure with the plurality of locations of the target user terminal as inputs of the first clustering procedure and assigning a first result of the first clustering procedure as a refined accident location of the plurality of locations of the target user terminal, wherein the first clustering procedure is conducted on processed locations of the plurality of locations;

in response to the determination of the plurality of refined accident locations, determine at least one accident-prone road section by operating a second clustering procedure with the plurality of refined accident locations corresponding to the plurality of accident records as the inputs of the second clustering procedure;

in response to the determination of the at least one accident-prone road section, generate electronic signals including information of one of the at least one accident-prone road section and a triggering code, wherein the triggering code:

is in a format recognizable by an application installed in an information receiving terminal, and configured to render the application to generate a presentation of the at least one accident-prone road section on an interface of the information receiving terminal; and direct the information receiving terminal to display the interface to present the accident-prone road section by sending the electronic signals to the information transmitting port.

wherein the operating the first clustering procedure include:

identify a plurality of points corresponding to the inputs;

determine a result cluster and a result point associated with the result cluster by a point-identification operation. including:

selecting a candidate cluster of points from the plurality of points:

selecting a candidate point from the candidate cluster of points;

operating a first iterative operation until a first stop criteria is met, wherein the first iterative operation includes a plurality of first iterations. and each of the first iteration includes:

using the candidate point as a center point and using the candidate cluster of points as a target cluster of points;

identifying, from the target cluster of points, a cluster of points that is within a predetermined distance from the center point as the candidate cluster of points; and identifying a point from the candidate cluster of points as the candidate point; and wherein the second clustering procedure includes the first clustering procedure; and to determine the at least one accident-prone road section, the processor is further directed to:

obtain the plurality of refined accident locations;

determine a plurality of result clusters by operating the second clustering procedure with the plurality of refined accident locations as inputs of the second clustering procedure; and for each of the plurality of result clusters, assign a road section corresponding to the result cluster as an accident-prone road section.

* * * * *